(12) United States Patent
Tokoro

(10) Patent No.: US 6,520,674 B1
(45) Date of Patent: Feb. 18, 2003

(54) MECHANICAL TIMEPIECE WITH POSTURE DETECTOR

(75) Inventor: Takeshi Tokoro, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/806,665

(22) PCT Filed: Aug. 12, 1999

(86) PCT No.: PCT/JP99/04378

§ 371 (c)(1),
(2), (4) Date: Jan. 15, 2002

(87) PCT Pub. No.: WO01/13182

PCT Pub. Date: Feb. 22, 2001

(51) Int. Cl.[7] ................ G04B 15/00; G04B 1/10; G04B 17/00

(52) U.S. Cl. .............. 368/127; 368/140; 368/169; 368/175

(58) Field of Search .................. 368/124–131, 368/140, 161–164, 168, 169, 175, 203–204

(56) References Cited

U.S. PATENT DOCUMENTS 3,714,773 A * 2/1973 Diersbock
3,892,066 A * 7/1975 Watkins
3,921,386 A * 11/1975 Keller

* cited by examiner

Primary Examiner—Vit Miska
(74) Attorney, Agent, or Firm—Adams & Wilks

(57) ABSTRACT

A mechanical timepiece has a mainspring for generating a rotational force and a front train wheel for undergoing rotation in accordance with a rotational force generated by the mainspring. An escapement/speed-control device for controlling rotation of the front train wheel has a balance with hairspring for undergoing reciprocal rotational movement, an escape wheel and pinion for undergoing rotation in accordance with rotation of the front train wheel, and a pallet fork for controlling rotation of the escape wheel and pinion in accordance with rotation of the balance with hairspring. A switch mechanism outputs an ON signal when a rotation angle of the balance with hairspring becomes a predetermined threshold angle or greater and outputs an OFF signal when the rotation angle of the balance with hairspring does not exceed the predetermined threshold angle. A position-detecting device detects a position of the mechanical timepiece. A balance-with-hairspring rotation angle control mechanism applies a force to suppress rotation of the balance with hairspring when the switch mechanism outputs an ON signal in accordance with a position of the mechanical timepiece detected by the position-detecting device.

17 Claims, 30 Drawing Sheets

* ORIGIN G TAKEN AS A CUBE CENTER OF GRAVITY

FIG. 15

| | A1 | A2 | A3 | A4 | A5 | A6 | POSITION | RESISTANCE (RATIO) |
|---|---|---|---|---|---|---|---|---|
| 1 | OFF | ON | ON | ON | ON | ON | −7≦α≦7° AND −7≦β≦7° (HORIZONTAL) | 1. |
| 2 | ON | OFF | ON | ON | ON | ON | −7≦α≦7° AND 83≦β≦97° (9 U) | 3.48 |
| 3 | ON | ON | OFF | ON | ON | ON | 83≦α≦97° AND −7≦β≦7° (12 U) | 3.48 |
| 4 | ON | ON | ON | OFF | ON | ON | −7≦α≦7° AND −83≦β≦−97°(3 U) | 3.48 |
| 5 | ON | ON | ON | ON | OFF | ON | −83≦α≦−97° AND −7≦β≦7°(6 U) | 3.48 |
| 6 | ON | ON | ON | ON | ON | OFF | 173≦α≦187° AND −7≦β≦7°(BACK HORIZONTAL) | 1 |
| 7 | OFF | ON | ON | ON | ON | ON | −7≦α≦−83° AND −7≦β≦7° | 1.83 |
| 8 | OFF | ON | ON | ON | ON | ON | 7≦α≦83° AND −7≦β≦7° | 1.83 |
| 9 | OFF | ON | ON | ON | ON | ON | −7≦α≦7° AND 7≦β≦83° | 1.83 |
| 10 | OFF | ON | ON | ON | ON | ON | −7≦α≦7° AND −7≦β≦−83° | 1.83 |
| 11 | ON | OFF | ON | ON | ON | ON | −83≦α≦−7° AND 83≦β≦97° | 1.83 |
| 12 | ON | OFF | ON | ON | ON | ON | 7≦α≦83° AND 83≦β≦97° | 1.83 |
| 13 | ON | ON | OFF | ON | ON | ON | −7≦α≦7° AND 97≦β≦173° | 1.83 |
| 14 | ON | ON | OFF | ON | ON | ON | −7≦α≦7° AND 7≦β≦83° | 1.83 |
| 15 | ON | ON | OFF | ON | ON | ON | 83≦α≦173° AND −7≦β≦−83° | 1.83 |
| 16 | ON | ON | OFF | ON | ON | ON | 97≦α≦173° AND −83≦β≦−97° | 1.83 |
| 17 | ON | ON | ON | OFF | ON | ON | −7≦α≦7° AND −97≦β≦−173° | 1.83 |
| 18 | ON | ON | ON | OFF | ON | ON | −97≦α≦−7° AND −7≦β≦7° | 1.83 |
| 19 | OFF | ON | ON | OFF | OFF | ON | −7≦α≦−83° AND −7≦β≦−83° | 3.48 |
| 20 | ON | ON | ON | OFF | OFF | ON | −97≦α≦−173° AND −7≦β≦−83° | 3.48 |
| 21 | OFF | ON | ON | ON | OFF | ON | −7≦α≦−83° AND 7≦β≦83° | 3.48 |
| 22 | ON | ON | ON | OFF | OFF | ON | −97≦α≦−173° AND 7≦β≦83° | 3.48 |
| 23 | ON | OFF | OFF | ON | ON | ON | 97≦α≦173° AND 7≦β≦83° | 3.48 |
| 24 | ON | ON | OFF | OFF | ON | ON | 97≦α≦173° AND −7≦β≦−83° | 3.48 |
| 25 | OFF | OFF | ON | ON | ON | ON | 7≦α≦83° AND −7≦β≦−83° | 3.48 |
| 26 | OFF | OFF | OFF | ON | ON | ON | 7≦α≦83° AND 7≦β≦83° | 3.48 |

* ROTATION ANGLE ABOUT X AXIS IS TAKEN α AND ROTATION ANGLE ABOUT Y AXIS IS β.
* Z-AXIS ROTATION ANGLE IN EACH ITEM IS ARBITRARY.

* ORIGIN G TAKEN AS A CUBE CENTER OF GRAVITY

MAINSPRING TORQUE CURVE

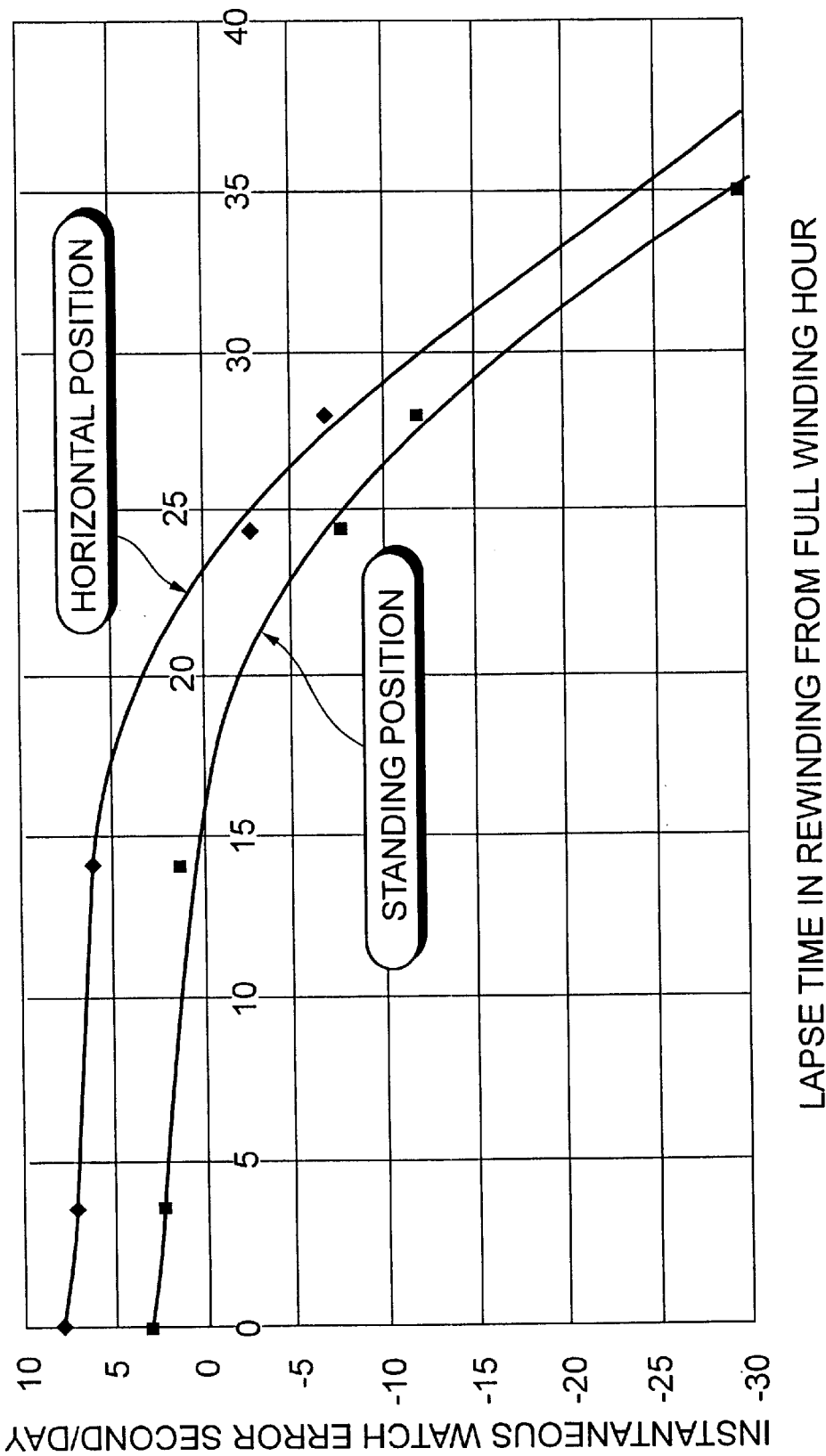

MECHANICAL TIMEPIECE WITH POSTURE DETECTOR

CROSS-REFERENCE TO RELATED APPLICATIONS

This application is a U.S. national state application of copending International Application Ser. No. PCT/JP99/04378, filed Aug. 12, 1999 claiming a priority date of Aug. 12, 1999, and published in a non-English language.

BACKGROUND OF THE INVENTION

1. Field of the Invention

The present invention relates to a mechanical timepiece having a position-detecting device structured to detect a position of the mechanical timepiece and control rotation of the balance with hairspring based on a result of the position detection.

2. Background Information (Conventional Mechanical Timepiece Structure)

In the conventional mechanical timepiece, as shown in FIG. 28 and FIG. 29, the mechanical-timepiece movement 1100 (mechanical body) has a main plate 1102 constituting a base plate for the movement. A hand setting stem 1110 is rotatably assembled in a hand-setting-stem guide hole 1102a of the main plate 1102. A dial 1104 (shown by the virtual line in FIG. 29) is attached to the movement 1100.

Generally, of the both sides of a main plate, the side having a dial is referred to as a "back side" of the movement and the opposite side to the side having the dial as a "front side". The train wheel assembled on the "front side" of the movement is referred to as a "front train wheel" and the train wheel assembled on the "back side" of the movement is as a "back train wheel".

Furthermore, the state of directing up a side having the dial is referred to as a "back horizontal state" and the state of directing down the side having the dial is referred to as a "horizontal-state".

Furthermore, the state of placing the dial vertical is referred to as a "standing position", the state of placing the dial 12:00 division vertically above is referred to as a "12:00 up (12U) position", the state of placing the dial 3:00 division vertically above is referred to as a "13:00 up (3U) position", the state of placing the dial 6:00 division vertically above is referred to as a "6:00 up (6U) position", and the state of placing the dial 9:00 division vertically above is referred to as a "9:00 up (9U) position".

The hand setting stem 1110 is determined in axial position by a switch device including a setting lever 1190, a yoke 1192, a yoke spring 1194 and a back holder 1196. A winding pinion 1112 is rotatably provided on a guide axis portion of the hand setting stem 1110. When rotating the hand setting stem 1110 in a state the hand setting stem 1110 is in a first hand-setting-stem position closest to an inward of the movement along a rotation axis direction (0 stage), the winding pinion 1112 rotates through rotation of the clutch wheel. A crown wheel 1114 rotates due to rotation of the winding pinion 1112. A ratchet wheel 1116 rotates due to rotation of the crown wheel 1114. By rotating the ratchet wheel 1116, a mainspring 1122 accommodated in a barrel complete 1120 is wound up. A center wheel and pinion 1124 rotates due to rotation of the barrel complete 1120. An escape wheel and pinion 1130 rotates through rotation of a fourth wheel and pinion 1128, third wheel and pinion 1126 and center wheel and pinion 1124. The barrel complete 1120, center wheel and pinion 1124, third wheel and pinion 1126 and fourth wheel and pinion 1128 constitutes a front train wheel.

An escapement/speed-control device for controlling rotation of the front train wheel includes a balance with hairspring 1140, an escape wheel and pinion 1130 and pallet fork 1142. The balance with hairspring 1140 includes a balance stem 1140a, a balance wheel 1140b and a stud mainspring 1140c. Based on the center wheel and pinion 1124, an hour pinion 1150 rotates simultaneously. A minute hand 1152 attached on the hour wheel 1150 indicates "minute". The hour pinion 1150 is provided with a slip mechanism for the center wheel and pinion 1124. Based on rotation of the hour pinion 1150, an hour wheel 1154 rotates through rotation of a minute wheel. An hour hand 1156 attached on the hour wheel 1154 indicates "hour".

The barrel complete 1120 is rotatably supported relative to the main plate 1102 and barrel bridge 1160. The center wheel and pinion 1124, the third wheel and pinion 1126, the fourth wheel and pinion 1128 and the escape wheel and pinion 1130 are rotatably supported relative to the main plate 1102 and train wheel bridge 1162. The pallet fork 1142 is rotatably supported relative to the main plate 1102 and pallet fork bridge 1164. The balance with hairspring 1140 is rotatably supported relative to the main plate 1102 and balance bridge 1166.

The stud mainspring 1140c is a thin leaf spring in a spiral (helical) form having a plurality of turns. The stud mainspring 1140c at an inner end is fixed to a stud ball 1140d fixed on the balance stem 1140a, and the stud mainspring 1140c at an outer end is fixed by screwing through a stud support 1170a attached to a stud bridge 1170 fixed on the balance bridge 1166.

A regulator 1168 is rotatably attached on the balance bridge 1166. A stud bridge 1168a and a stud rod 1168b are attached on the regulator 1168. The stud mainspring 1140c has a near-outer-end portion positioned between the stud bridge 1168a and the stud rod 1168b.

(Conventional Mechanical Timepiece Mainspring Torque and Balance with Hairspring Swing Angle)

Generally, in the conventional representative mechanical timepiece, as shown in FIG. 30, the torque on the mainspring decreases while being rewound as the sustaining time elapses from a state the mainspring is fully wound (full winding state). For example, in the case of FIG. 30, the mainspring torque in the full winding state is about 27 g·cm, which become about 23 g·cm at a lapse of 20 hours from the full winding state and about 18 g·cm at a lapse of 40 hours from the full winding state.

Generally, in the conventional representative mechanical timepiece, as shown in FIG. 31, the decrease of mainspring torque also decreases a swing angle of the balance with hairspring. For example, in the case of FIG. 31, the swing angle of the balance with hairspring is approximately 240 to 270 degrees when the mainspring torque is 25 to 28 g·cm while the swing angle of the balance with hairspring is approximately 180 to 240 degrees when the mainspring torque is 20 to 25 g·cm.

(Conventional Mechanical Timepiece Instantaneous Watch Error)

Referring to FIG. 32, there is shown transition of an instantaneous watch error (numeral value indicative of timepiece accuracy) against a swing angle of a balance with hairspring in the conventional representative mechanical timepiece. Here, "instantaneous watch error" refers to "a value representative of fast or slow of a mechanical timepiece at a lapse of one day on the assumption that the mechanical timepiece is allowed to stand while maintaining a state or environment of a swing angle of a balance with hairspring upon measuring a watch error". In the case of FIG. 32, the instantaneous watch error delays when the swing angle of the balance with hairspring is 240 degrees or greater or 200 degrees or smaller.

For example, in the conventional representative mechanical timepiece, as shown in FIG. 32, the instantaneous watch error is about 0 to 5 seconds per day (about 0 to 5 second fast per day) when the swing angle of the balance with hairspring is about 200 to 240 degrees while the instantaneous watch error becomes about −20 seconds per day (about 20 seconds slow per day) when the swing angle of the balance with hairspring is about 170 degrees.

Referring to FIG. 27, there is shown a transition of an instantaneous watch error and a lapse time upon rewinding the mainspring from a full winding state in the conventional representative mechanical timepiece. Here, in the conventional mechanical timepiece, the "watch error" indicative of timepiece advancement per day or timepiece delay per day is shown by a bold thin line in FIG. 27, which is obtainable by integrating over 24 hours an instantaneous watch error against a lapse time of rewinding the mainspring from the full winding.

Generally, in the conventional mechanical timepiece, the instantaneous watch error slows down because the mainspring torque decreases and the balance-with-hairspring swing angle decreases as the sustaining time elapses with the mainspring being rewound from a full winding state. Due to this, in the conventional mechanical timepiece, the instantaneous watch error in a mainspring full winding state is previously put forward in expectation of timepiece delay after lapse of a sustaining time of 24 hours, thereby previously adjusting plus the "watch error" representative of timepiece advancement or delay per day.

For example, in the conventional representative mechanical timepiece, as shown by a bold line in FIG. 27, the instantaneous watch error in a full winding state is about 5 seconds per day (about 5 seconds fast per day). However, when 20 hour elapses from the full winding state, the instantaneous watch error becomes about −1 seconds per day (about 1 second slow per day). When 24 hours elapses from the full winding state, the instantaneous watch error becomes about −5 second per day (about 5 seconds slow per day). When 30 hours elapses from the full winding state, the instantaneous watch error becomes about 15 seconds per day (about 15 seconds slow per day).

(Conventional Mechanical Timepiece Position and Instantaneous Watch Error)

Meanwhile, in the conventional representative mechanical timepiece, the instantaneous watch error in a "horizontal position" and a "back horizontal position" is on a faster side than the instantaneous watch error in a "standing position".

For example, the conventional representative mechanical timepiece, when in a "horizontal position" and a "back horizontal position, in a full winding state has an instantaneous watch error of about 8 seconds per day (about 8 seconds fast per day), as shown by a bold line in FIG. 33. When 20 hours elapses from the full winding state, the instantaneous watch error becomes about 3 seconds per day (about 3 seconds fast per day). When 24 hours elapses from the full winding state, the instantaneous watch error becomes about −2 seconds per day (about 2 seconds slow per day). When 30 hours elapses from the full winding state, the instantaneous watch error becomes about −12 seconds per day (about 12 seconds slow per day).

Contrary to this, the conventional representative mechanical timepiece, when in a "standing position", in a full winding state has an instantaneous watch error of about 3 seconds per day (about 3 seconds fast per day), as shown by a thin line in FIG. 33. When 20 hours elapses from the full winding state, the instantaneous watch error becomes about −2 seconds per day (about 2 seconds slow per day). When 24 hours elapses from the full winding state, the instantaneous watch error becomes about −7 seconds per day (about 7 seconds slow per day). When 30 hours elapses from the full winding state, the instantaneous watch error becomes about −17 seconds per day (about 17 seconds slow per day).

(Representative Documents Disclosing Related Arts)

The conventional balance-with-hairspring swing angle adjusting device disclosed in Japanese Utility Model Laid-open No. 41675/1979 has a swing angle adjusting plate to cause eddy current each time the balance magnet swingingly approaches thereby applying a brake force to the balance with hairspring.

Meanwhile, the conventional position-detecting device disclosed in Japanese Patent Laid-open No. 307805/1994 has a hollow outer spherical member and an inner spherical member fixed by providing a predetermined layer space in an outer spherical member hollow portion, so that a fluid conductor is arranged between a first conductive region including an electrode provided on an inside entire region of the outer spherical member and a second conductive region including a plurality of electrodes provided spotted on an outer side of the inner spherical member. In the conventional position-detecting device, the fluid conductor can move in the layer space between the first conductive region and the second conductive region. A position of the device can be structurally detected by conduction of the fluid conductor between the one of electrode in the second conductive region and the electrode in the first conductive region.

(Object of the Invention)

It is an object of the invention to provide a mechanical timepiece capable of detecting a position of the mechanical timepiece and, by a result of the detection, control a swing angle of the balance with hairspring within a constant range.

Furthermore, another object of the invention is to provide a mechanical timepiece which is less in instantaneous watch rate change and accurate even after lapse of time from a full winding state.

SUMMARY OF THE INVENTION

The present invention is, in a mechanical timepiece structured having a mainspring constituting a power source for the mechanical timepiece, a front train wheel rotating due to rotational force given upon rewinding the mainspring and an escapement/speed-control device for controlling rotation of the front train wheel, the escapement/speed-control device being structured including a balance with hairspring alternately repeating right and left rotation, an escape wheel and pinion rotating based on rotation of the front train wheel and a pallet fork controlling rotation of the escape wheel and pinion based on operation of the balance with hairspring, the mechanical timepiece characterized by comprising: a switch mechanism structured to output an on signal when a rotation angle of the balance with hairspring becomes a predetermined threshold or greater, and an off signal when the rotation angle of the balance with hairspring is not excess of the predetermined threshold; a balance-with-hairspring rotation angle control mechanism structured to apply such a force as suppressing against rotation of the balance with hairspring when the switch mechanism outputs an on signal; and a position-detecting device for detecting a position of the mechanical timepiece.

The mechanical timepiece of the invention is structurally characterized in that the balance-with-hairspring rotation angle control mechanism is controlled in operation based on a result of detection of a position of the mechanical timepiece detected by the position-detecting device.

In the mechanical timepiece of the invention, the switch mechanism is preferably structured to output an on signal when a stud mainspring provided on the balance with hairspring contacts a contact member constituting a switch lever.

Also, in the mechanical timepiece of the invention, the balance-with-hairspring rotation angle control mechanism preferably includes a balance magnet provided on the balance with hairspring and coils arranged to exert a magnetic force to the balance magnet, and the coils being structured to apply a magnetic force to the balance magnet to suppress rotation of the balance with hairspring when the switch mechanism outputs an on signal, and not to apply a magnetic force to the balance magnet when the switch mechanism outputs an off signal.

Also, in the mechanical timepiece of the invention, the position-detecting device preferably includes a case having a hexahedron shape, electrodes respectively arranged on a one-to-one basis to inner surfaces of the case, and a conductive fluid accommodated in the case.

Also, in the mechanical timepiece of the invention, the conductive fluid preferably structurally takes a state of contacting five of the electrodes, a state of contacting four of the electrodes, and a state of contacting three.

Also, in the mechanical timepiece of the invention, the position-detecting device preferably includes a case having a hexahedron shape, electrodes respectively arranged in plurality to inner surfaces of the case, and a conductive fluid accommodated in the case.

Also, in the mechanical timepiece of the invention, the position-detecting device preferably includes a case having a hexahedron shape and formed of an insulating material, six electrodes respectively arranged to inner surfaces of the case, and a conductive fluid accommodated in the case, and further having a plurality of resistances different in resistance value provided in a manner corresponding to a conducting state of the six electrodes, whereby one of the resistances is put into connection to the coils based on a result of detection of a position of the mechanical timepiece detected by the position-detecting device.

With the structure as above, it is possible to effectively control the rotation angle of the balance with hairspring of the mechanical timepiece thereby improving the accuracy of the mechanical timepiece.

BRIEF DESCRIPTION OF THE DRAWINGS

FIG. 15 is a list showing a relationship between a position the mechanical timepiece is placed, a conduction state of the electrode pattern and a value of a resistance provided on the circuit block.

FIG. 16 is a magnified fragmentary sectional view showing a schematic form of a balance with hairspring part of the mechanical timepiece of the invention in a state the switch mechanism is on.

FIG. 17 is a magnified fragmentary sectional view showing a schematic form of a balance with hairspring part of the mechanical timepiece of the invention in a state the switch mechanism is on.

FIG. 33 is a graph schematically showing a relationship between a lapse time of rewinding the mainspring from a full winding state and a mainspring torque (in horizontal position and standing position) in the mechanical timepiece.

DETAILED DESCRIPTION OF THE PREFERRED EMBODIMENTS

Figure 1:
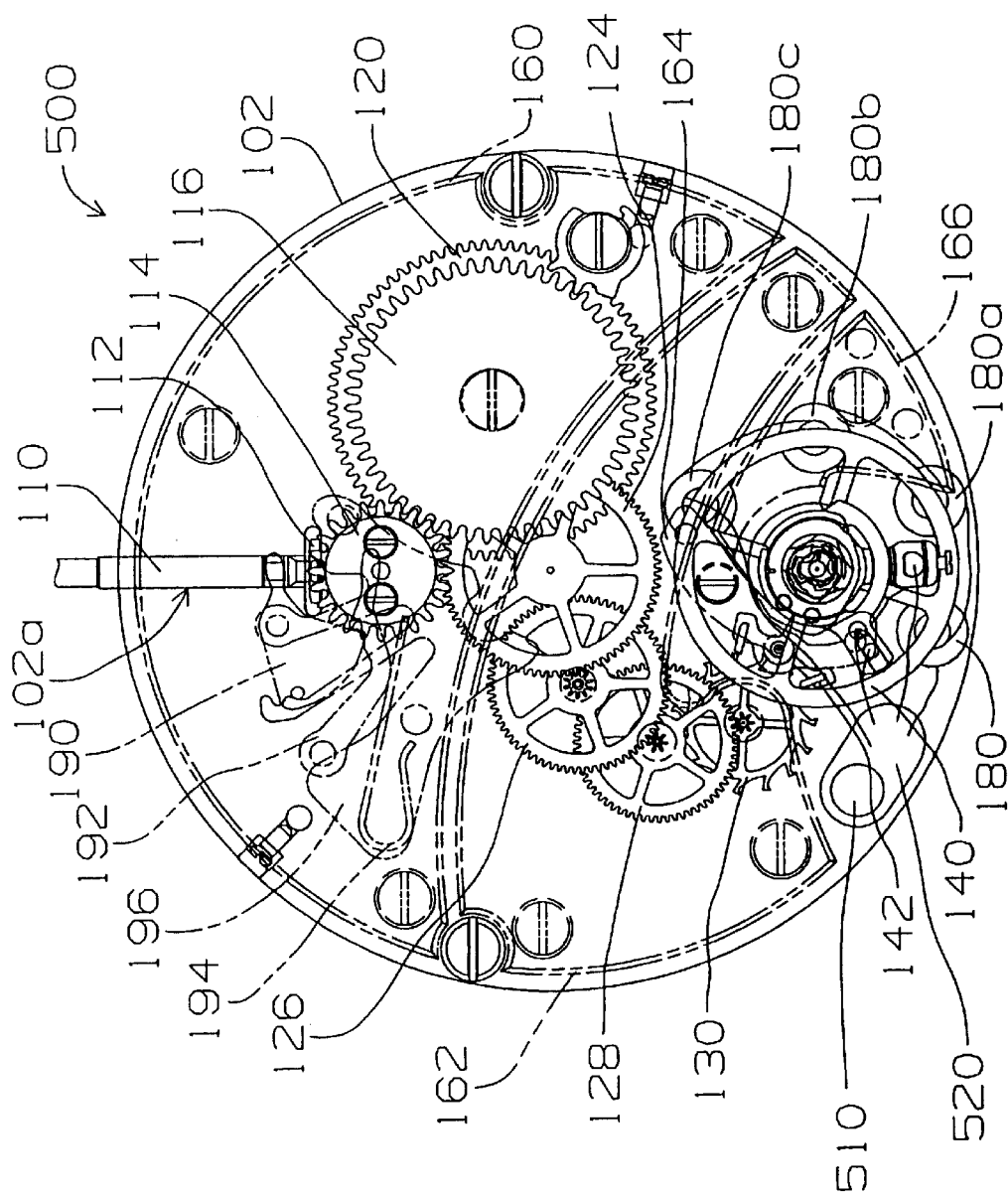
FIG. 1 is a plan view showing a schematic form of a movement front side of a mechanical timepiece of the present invention (in FIG. 1, parts are partly omitted and bridge members are shown by virtual lines).

Hereunder, embodiments of a mechanical timepiece of the present invention will be explained based on the drawings.
(1) Train Wheel, Escape/Speed-Control Device and Switch Device Referring to FIG. 1 and FIG. 2, in an embodiment of a mechanical timepiece of the invention, a movement (mechanical body) 500 of the mechanical timepiece has a main plate 102 structuring a base plate for the movement. A hand setting stem 110 is rotatably assembled in a winding-stem guide hole 102a of the main plate 102. A dial 104 (shown by a virtual line in FIG. 2) is attached on the movement 500.

The hand setting stem 110 has a squared portion and a guide shaft portion. A clutch wheel (not shown) is assembled on the square portion of the hand setting stem 110. The clutch wheel has a same rotation axis as a rotation axis of the hand setting stem 110. That is, the clutch wheel is provided having a squared hole and rotated based on rotation of the hand setting stem 110 by fitting the squared hole on the squared portion of the hand setting stem 110. The clutch wheel has teeth A and teeth B. The teeth A are provided in the clutch wheel at an end close to a center of the movement. The teeth B are provided in the clutch wheel at an end close to an outside of the movement.

The movement 500 is provided with a switch device to determine an axial position of the winding stem 110. The switch device includes a setting lever 190, a yoke 192, a yoke spring 194 and a setting lever jumper 196. The hand-setting stem 110 is determined in rotation-axis position based on rotation of the setting lever. The clutch wheel is determined in rotation-axis position based on rotation of the yoke. The yoke is to be determined at two positions in rotational direction.

A winding pinion 112 is rotatably provided on the guide shaft portion of the hand setting stem 110. When the hand setting stem 110 is rotated in a state that the hand setting stem 110 is positioned at a first hand setting stem position closest to a movement inner side along the rotation axis direction (in a 0 stage), the winding pinion 112 is structurally rotated through rotation of the clutch wheel. A crown wheel 114 is structured to rotate due to rotation of the winding pinion 112. A ratchet wheel 116 is structured to rotate due to rotation of the crown wheel 114.

The movement 500 has as a power source a mainspring 122 accommodated in a barrel complete 120. The mainspring 122 is made of an elastic material having springiness, such as iron. The mainspring 122 is structured for rotation due to rotation of the ratchet wheel 116.

A center wheel and pinion 124 is structured for rotation due to rotation of the barrel complete 120. A third wheel and pinion 126 is structured rotatable based on rotation of the center wheel and pinion 124. A fourth wheel and pinion 128 is structured rotatable based on rotation of the third wheel and pinion 126. An escape wheel and pinion 130 is structured for rotation due to rotation of the fourth wheel and pinion 128. The barrel complete 120, the center wheel and pinion 124, the third wheel and pinion 126 and the fourth wheel and pinion 128 constitute a front train wheel.

The movement 500 has an escapement/governing device to control rotation of the front train wheel. The escapement/governing device includes a balance with hairspring 140 to repeat right and left rotation with a constant period, an escape wheel and pinion 130 to rotate based on rotation of the front train wheel, and pallet fork 142 to control rotation of the escape wheel and pinion 130 based on the operation of operation of the balance with hairspring 140.

The balance with hairspring 140 includes a balance stem 140a, a balance wheel 140b and a stud mainspring 140c. The stud mainspring 140c is made of an elastic material having springiness, such as "elinvar". That is, the stud mainspring 140c is made of a metallic conductive material.

Based on rotation of the center wheel and pinion 124, an hour pinion 150 simultaneously rotates. The hour pinion 150 is structured having a minute hand 152 to indicate "minute". The hour pinion 150 is provided with a slip mechanism having predetermined slip torque to the center wheel and pinion 124.

Based on rotation of the hour pinion 150, a minute wheel (not shown) rotates. Based on rotation of the minute wheel, an hour wheel 154 rotates. The hour wheel 154 is structured having an hour hand 156 to indicate "hour".

The barrel complete 120 is supported for rotation relative to the main plate 102 and barrel bridge 160. The center wheel and pinion 124, third wheel and pinion 126, fourth wheel and pinion 128 and escape wheel and pinion 130 are supported for rotation relative to the main plate 102 and train wheel bridge 162. The pallet fork 142 is supported for rotation relative to the main plate 102 and pallet bridge 164.

The balance with hairspring 140 is supported for rotation relative to the main plate 102 and balance bridge 166. That is, the balance stem 140a has an upper tenon 140a1 supported for rotation relative to a balance upper bearing 166a fixed on the balance bridge 166. The balance upper bearing 166a includes a balance upper hole jewel and a balance upper bridge jewel. The balance upper hole jewel and the balance upper balance jewel are formed of an insulating material such as ruby.

The balance stem 140a has a lower tenon 140a2 supported for rotation relative to the balance lower bearing 102b fixed on the main plate 102. The balance lower bearing 102b includes a balance lower hole jewel and a balance lower bridge jewel. The balance lower hole jewel and the balance lower bridge jewel are made of an insulating material such as ruby.

The stud mainspring 140c is a thin leaf spring in a spiral (helical) form having a plurality of turns. The stud mainspring 140c at an inner end is fixed to a stud ball 140d fixed on the balance stem 140a, and the stud mainspring 140c at an outer end is screwed through a stud support 170a attached to a stud bridge 170 rotatably fixed on the balance bridge 166. The balance bridge 166 is made of a metallic conductive material such as brass. The stud bridge 170 is made of a metallic conductive material such as iron.

(2) Switch Mechanism

Next, explanation will be made on a switch mechanism of the mechanical timepiece of the invention.

Referring to FIG. 1 to FIG. 4, a switch lever 168 is rotatably attached on the balance bridge 166. A first contact member 168a and a second contact member 168b are attached on a switch lever 168. The switch lever 168 is attached on the balance bridge 166 for rotation about a rotation center of the balance with hairspring 140. The switch lever 168 is formed of a plastic insulating material such as polycarbonate. The first contact member 168a and the second contact member 168b are made of a metallic conductive material such as brass. The stud mainspring 140c at its near-outer-end portion is positioned between the first contact member 168a and the second contact member 168b.

Coils 180, 180a, 180b, 180c are attached on a front surface of the main plate 102 in a manner facing to a main-plate-side surface of the balance wheel 140b. The number of coils, as shown in FIG. 1 to FIG. 4, is for example four, but may be one, two, three or four or more.

A balance magnet 140e is attached on the main-plate-side surface of the balance wheel 140b in a manner facing to the front surface of the main plate 102.

Figure 3:
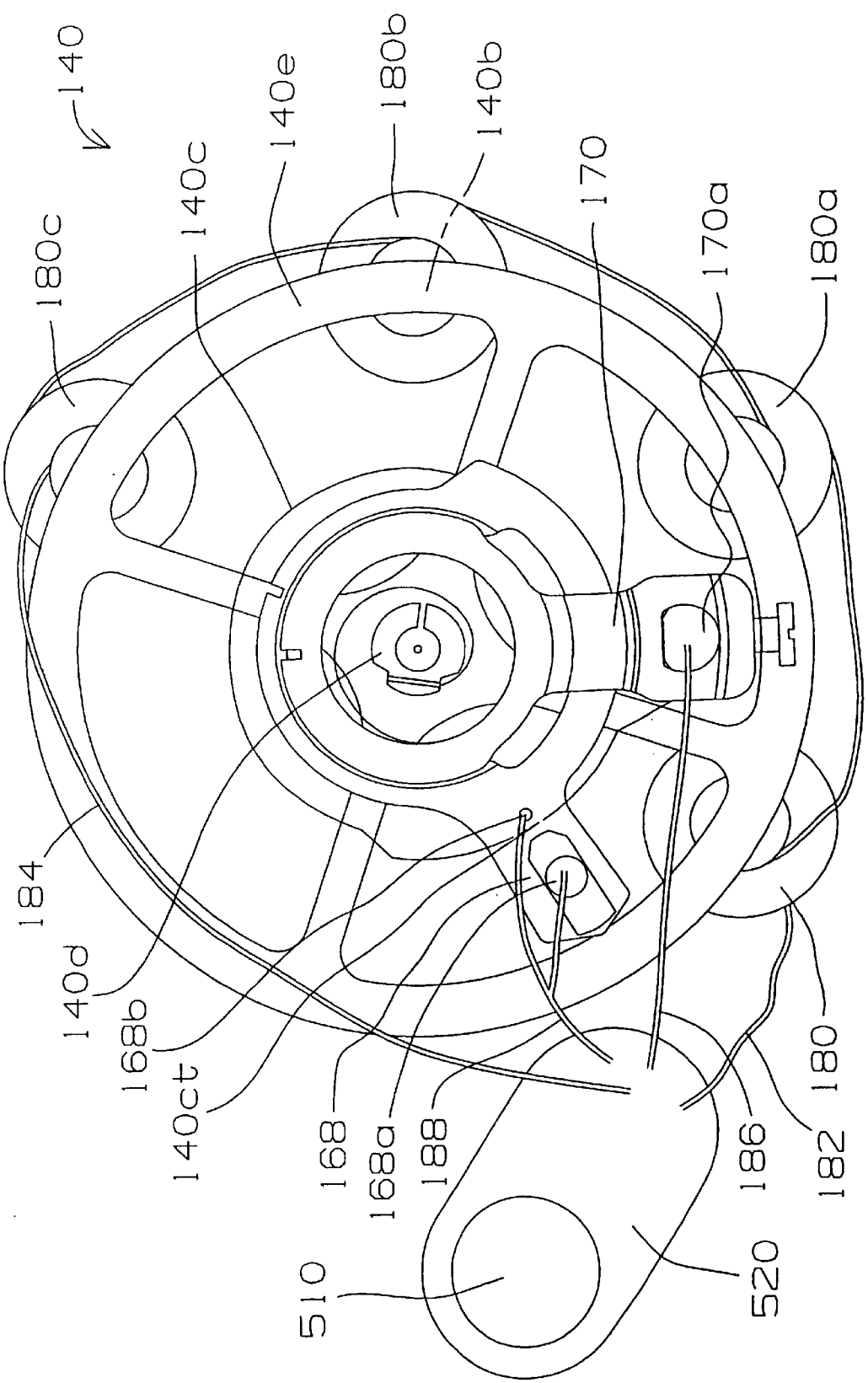
FIG. 3 is a magnified fragmentary sectional view showing a schematic form of a balance with hairspring part of the mechanical timepiece of the invention in a state a switch mechanism is off.

As shown in FIG. 1 and FIG. 3, in the case of arranging a plurality of coils, a circumferential interval of the coils is preferably greater integer-times a circumferential interval between S and N poles of the balance magnet 140e arranged opposite to the coils. However, all the coils may not have a same interval in the circumferential direction. Furthermore, in such a structure as having a plurality of coils, the interconnections between the coils are preferably connected in series not to mutually cancel current generated on each coil due to electromagnetic induction. Otherwise, the interconnections between the coils may be connected in parallel not to mutually cancel current generated on each coil due to electromagnetic induction.

Figure 5:
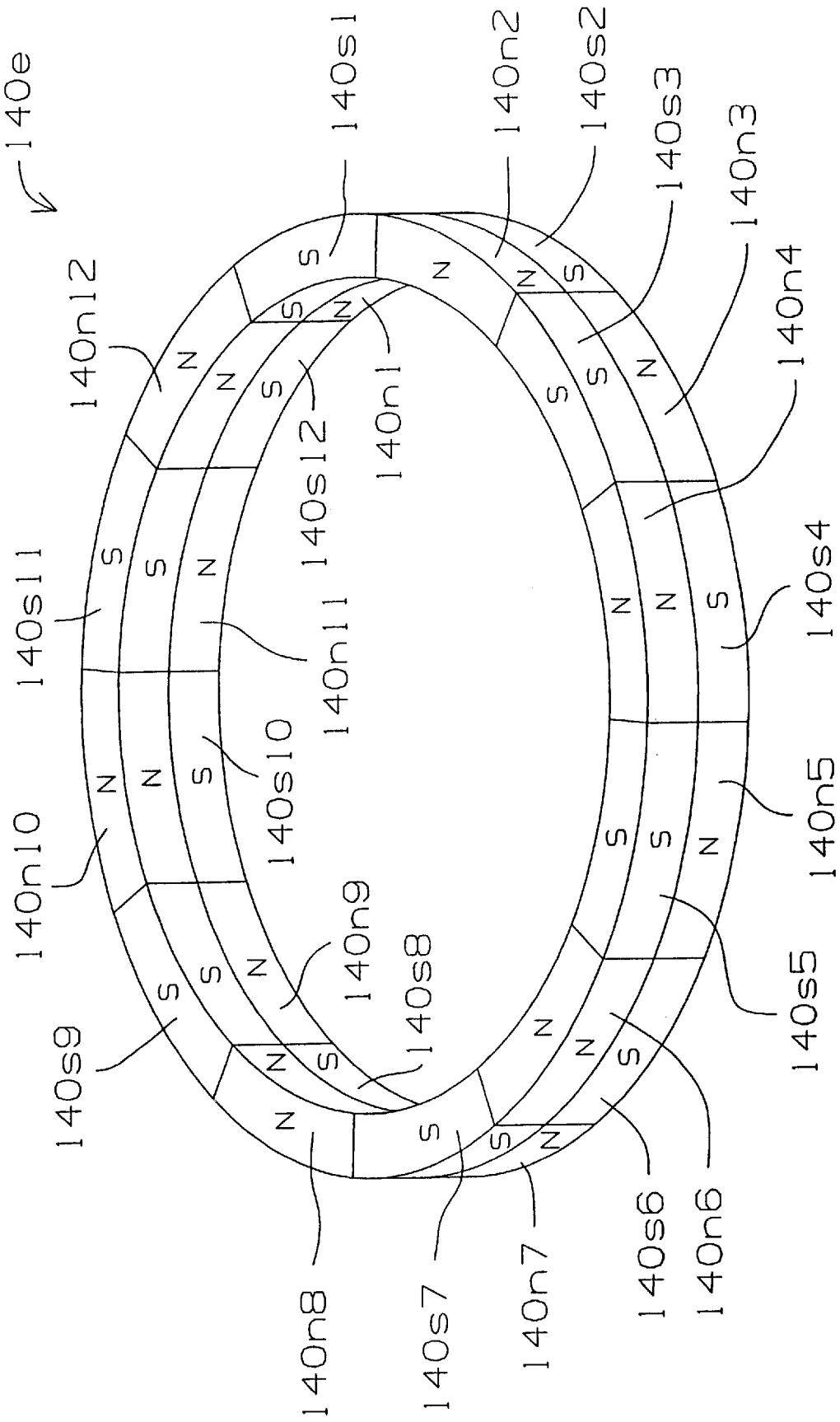
FIG. 5 is a perspective view showing a schematic form of a balance magnet used in the mechanical timepiece of the invention.

Referring to FIG. 5, the balance magnet 140e has an annular (ring-formed) shape and is alternately provided, along a circumferential direction, with magnet portions constituted, for example, by twelve S poles 140s1–140s12 and twelve N poles 140n1–140n12 that are vertically polarized. Although the number of magnet portions arranged annular (in a ring form) in the balance magnet 140e in the example shown in FIG. 5 is twelve, it may be in a plurality of two or more. Here, it is preferred to provide the magnet portion with one bowstring length nearly equal to an outer diameter of one coil provided opposite to the magnet portion.

Figure 2:
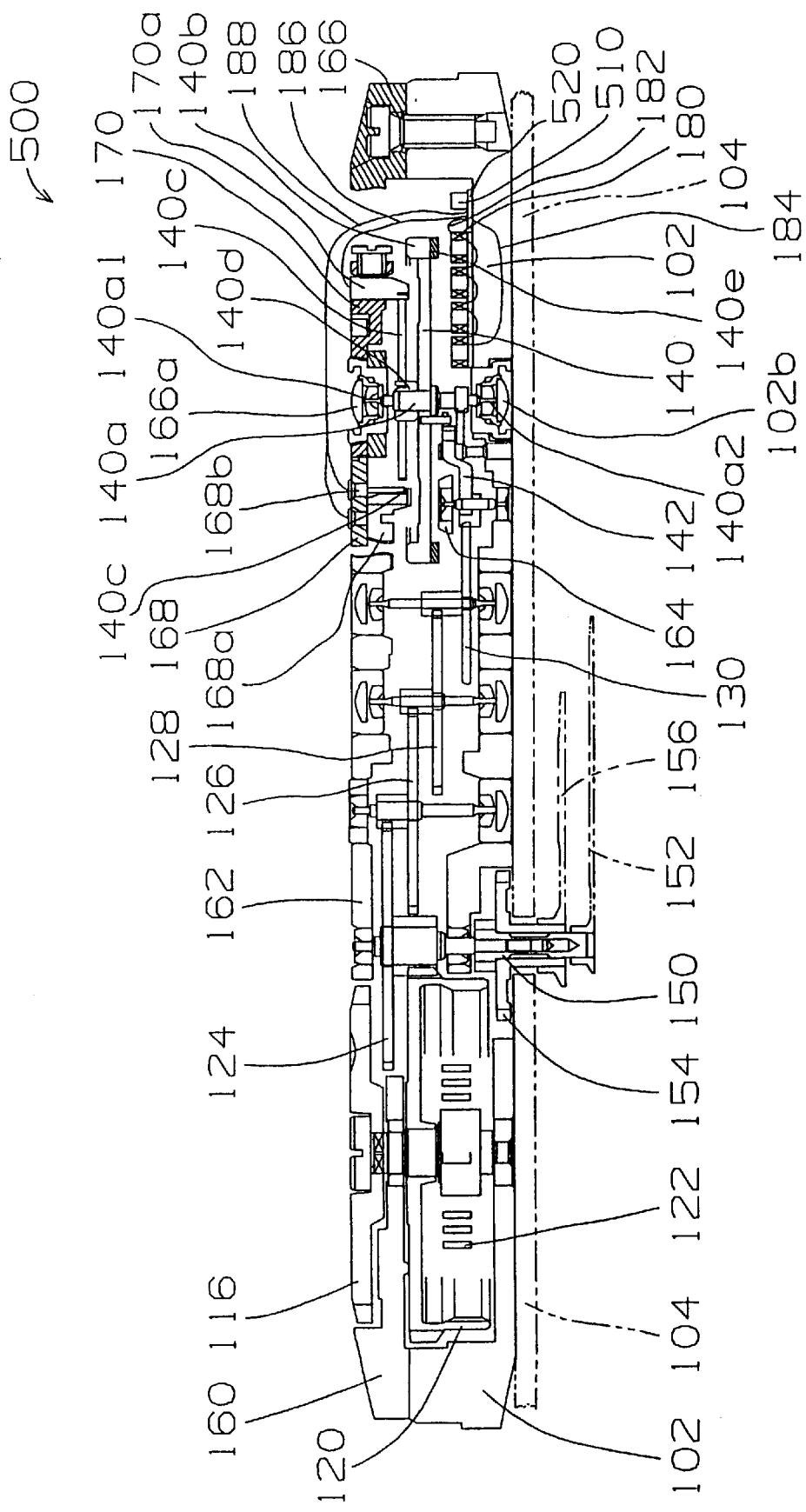
FIG. 2 is a schematic fragmentary sectional view showing the movement of the invention (in FIG. 2, parts are partly omitted).
Figure 4:
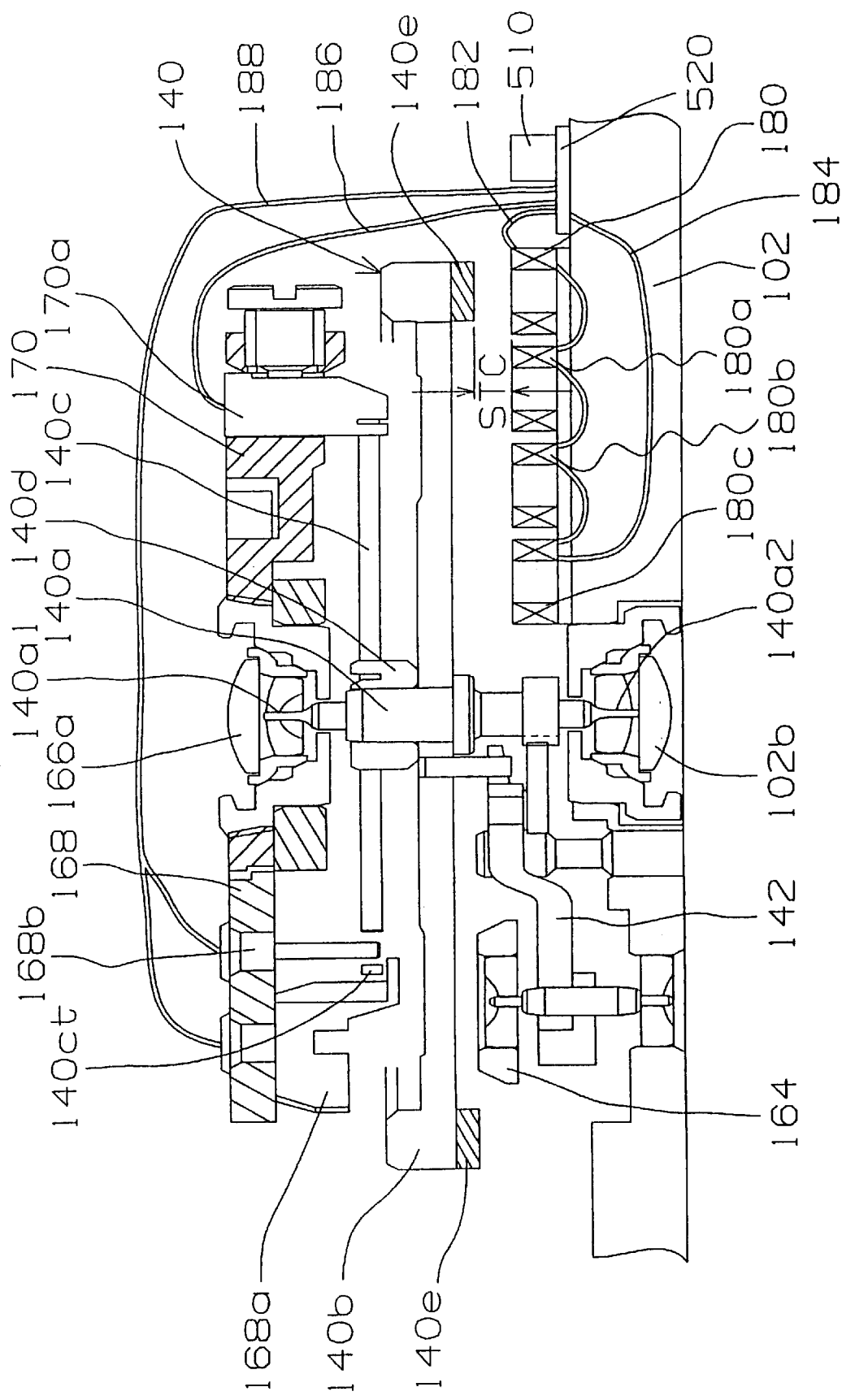
FIG. 4 is a magnified fragmentary sectional view showing a schematic form of a balance with hairspring part of the mechanical timepiece of the invention in a state a switch mechanism is off.

Referring to FIG. 2 and FIG. 4, a gap is provided between the balance magnet 140e and the coil 180, 180a, 180b, 180c. The gap between the balance magnet 140e and the coil 180, 180a, 180b, 180c is determined such that the balance magnet 140e has a magnetic force capable of giving effects upon the coil 180, 180a, 180b, 180c when the coil 180, 180a, 180b, 180c is energized.

When the coil 180, 180a, 180b, 180c is not energized, the magnetic force on the balance magnet 140e will not have effects on the coil 180, 180a, 180b, 180c. The balance magnet 140e is fixed, for example, through adhesion to the main-plate-side surface of the balance wheel 140b in such a state that one surface is in contact with a ring rim of the balance wheel 140b and the other surface facing to the front surface of the main plate 102.

Incidentally, the stud mainspring 140c although illustrated by exaggeration in FIG. 4 has a thickness (radial thickness of the balance with hairspring) of 0.021 millimeter, for example. The balance magnet 140e has, for example, an outer diameter of approximately 9 millimeters, an inner diameter of approximately 7 millimeters, a thickness of approximately 1 millimeter and a magnetic flux density of approximately 1 tesla. The coil 180, 180a, 180b, 180c respectively has the number of turns, for example, of 1000 turns and a coil diameter of approximately 25 micrometers. The gap STC between the balance magnet 140e and the coil 180, 180a, 180b, 180c is, for example, approximately 0.4 millimeter.

(3) Position-detecting Device

Next, explanation will be made on a position-detecting device 510 and circuit block 520 in an embodiment of a mechanical timepiece of the invention.

Referring to FIG. 1 to FIG. 4, a position-detecting device 510 and circuit block 520 is arranged on a front side of the main plate 102. The position-detecting device 510 is mounted on the circuit block 520. The circuit block 520 has a plurality of lead terminals.

A first lead wire 182 is provided to connect between one end terminal of the coil 180 and a first lead terminal (not shown) of the circuit block 520. The other terminal of the coil 180 is connected to one terminal of the coil 180a. The other terminal of the coil 180a is connected to one terminal of the coil 180b. The other terminal of the coil 180b is connected to one terminal of the coil 180c. That is, the four coils 180, 180a, 180b, 180c are connected in series.

A second lead 184 is provided to connect between the other terminal of the coil 180c and a second lead terminal (not shown) of the circuit block 520. A third lead wire 186 is provided to connect between the stud bridge 170 and a third terminal (not shown) of the circuit block 520. A fourth lead wire 188 is provided to connect between the first contact member 168a and second contact member 168b and a fourth lead terminal (not shown) of the circuit block 520.

(3.1) First Embodiment of Position-detecting Device

Next, explanation will be made on a structure of a first embodiment of a position-detecting device used in the mechanical timepiece of the invention.

Figure 6:
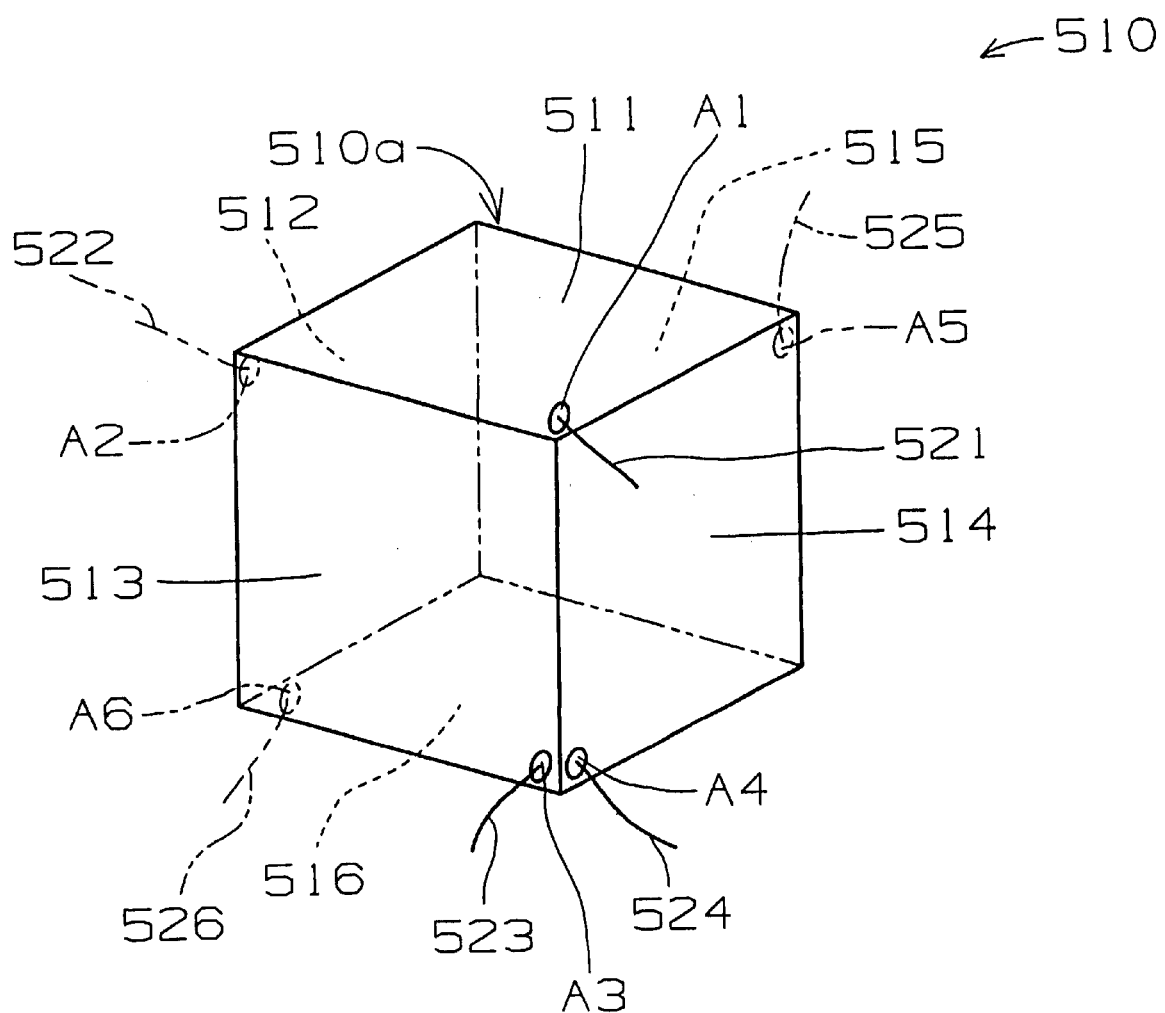
FIG. 6 is a magnified perspective view showing a schematic form of a position-detecting device used in the mechanical timepiece of the invention.
Figure 7:
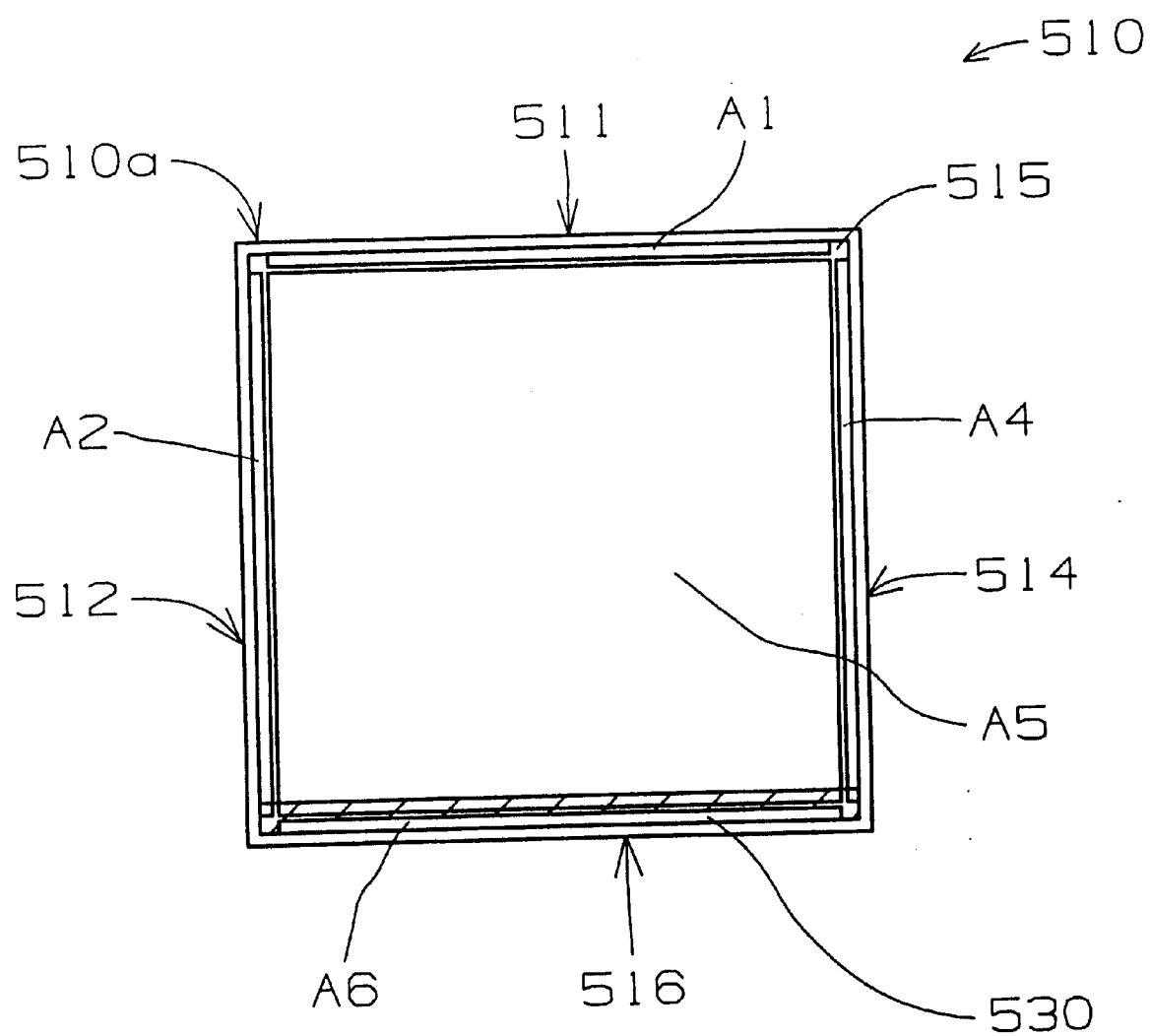
FIG. 7 is a magnified perspective view showing a schematic form of a position-detecting device used in the mechanical timepiece of the invention.
Figure 8:
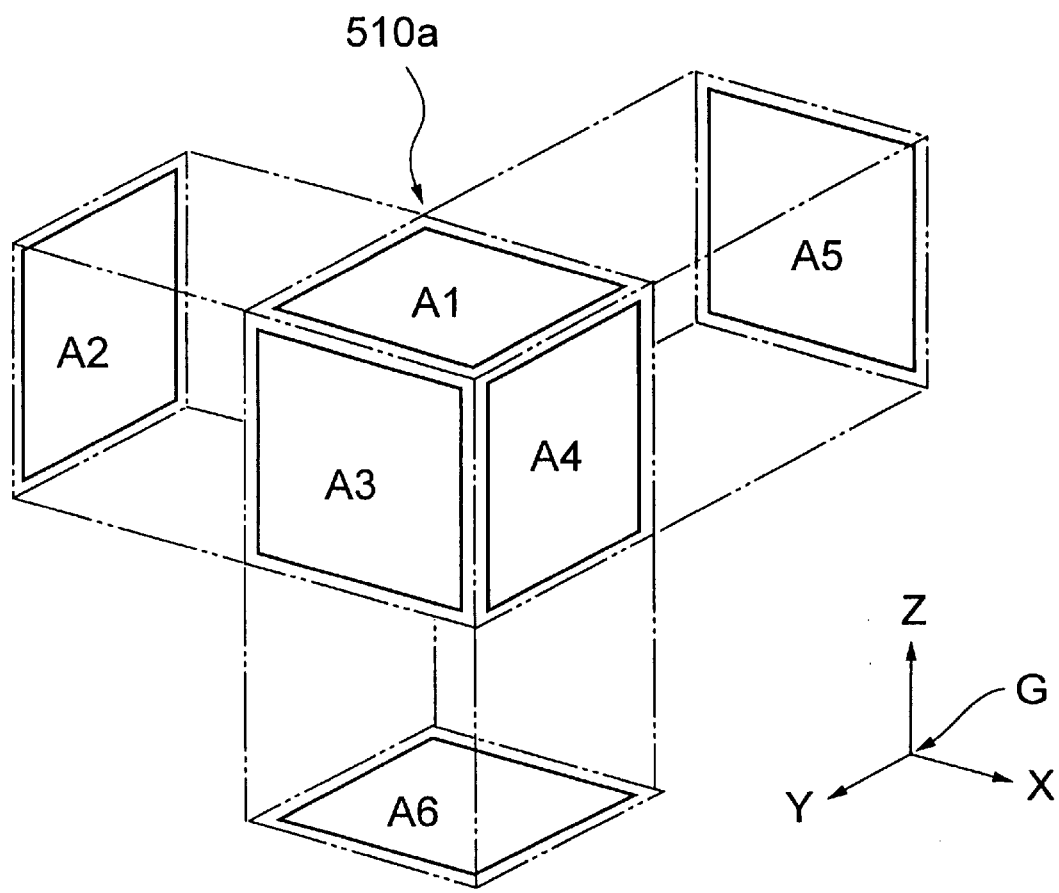
FIG. 8 is a magnified perspective view showing a schematic form of an electrode pattern of a position-detecting device used in the mechanical timepiece of the invention (in FIG. 8, the case 510a is shown by the two-dot chain line while omitting the lines showing the thickness of the respective electrodes).

Referring to FIG. 6 to FIG. 8, a position-detecting device 510 has a case 510a having a nearly cubic form. The case 510a has a top wall 511, four sidewalls 512, 513, 514, 515 and a bottom wall 516.

Although the case for the position-detecting device used in the mechanical timepiece of the invention is preferably has a nearly cubic form, the case form may be other hexahedrons such as rectangular parallelepiped.

The case 510a is formed of an insulating material, such as plastic such as polyimide, glass epoxy substrate, quartz or the like.

In the case 510a, the top wall 511 is orthogonal to each sidewall 512, 513, 514, 515.

The bottom wall 516 is orthogonal to each sidewall 512, 513, 514, 515.

The sidewall 512 is perpendicular to the sidewall 513 and the sidewall 515.

The sidewall 514 is perpendicular to the sidewall 513 and the sidewall 515.

Referring to FIG. 8, an electrode A1 is provided on almost an entire inner surface of the top wall 511. An electrode A2 is provided on almost an entire inner surface of the sidewall 512. An electrode A3 is provided on almost an entire inner surface of the sidewall 513. An electrode A4 is provided on almost an entire inner surface of the sidewall 514. An electrode A5 is provided on almost an entire inner surface of the sidewall 515. An electrode A6 is provided on almost an entire inner surface of the bottom wall 516.

Although in FIG. 8 the electrode A2, the electrode A5 and the electrode A6 are shown distant from the case 510a for easy understanding of explanation, the electrode A1, electrode A2, electrode A3, electrode A4, electrode A5 and electrode A6 is arranged to nearly structure a cube. Also, the electrode A1, electrode A2, electrode A3, electrode A4, electrode A5 and electrode A6 is arranged with spacing. That is, the electrode A1, the electrode A2, the electrode A3, the electrode A4, the electrode A5 and the electrode A6 are insulated from one another.

In FIG. 8, a center of gravity G of a cube of the case 510a is defined as an origin of a coordinate. A positive direction of an X-axis is defined as a direction of from the origin G to the electrode A4 vertically toward an outside of the case 510a.

A Y-axis is defined as a direction vertical to the electrode A3. A positive direction of the Y-axis is defined as a direction of from the origin G to the electrode A3 vertically toward the outside of the case 510a.

A Z-axis is defined as a direction vertical to the electrode A1. A positive direction of the Z-axis is defined as a direction of from the origin G to the electrode A1 vertically toward the outside of the case 510a.

In the embodiment of the mechanical timepiece of the invention, the position-detecting device 510 is arranged relative to the main plate 102 such that the X axis and Y axis are in parallel with a surface of the main plate 102 and with a surface of the dial 104. Consequently, the position-detecting device 510 is structured relative to the main plate 102 such that the Z-axis is vertical to the surface of the main plate 102 and to the dial 104.

Referring to FIG. 6, an electrode lead wire 521 is connected to the electrode A1. An electrode lead wire 522 is connected to the electrode A2. An electrode lead wire 523 is connected to an electrode A3. An electrode lead wire 524 is connected to the electrode A4. An electrode lead wire 525 is connected to the electrode A5. An electrode lead wire 526 is connected to the electrode A6.

Referring to FIG. 7, conductive fluid 530 is accommodated in the case 510a. The conductive fluid 530 is, for example, mercury. Although the volume of the conductive fluid 530, in the example shown in FIG. 7, is $\frac{1}{48}$th of a volume of the case 510a, it is preferably $\frac{1}{6}$th to $\frac{1}{48}$th of the volume of the case 510a.

In the state shown in FIG. 7, the conductive fluid 530 is in contact with the electrode A2, electrode A3, electrode A4, electrode A5 and electrode A6 but out of contact with the electrode A1. Consequently, in the state shown in FIG. 7, the electrode A2, the electrode A3, the electrode A4, the electrode A5 and the electrode A6 are short-circuited (or in conduction with one another ) through the conductive fluid 530.

Figure 9:
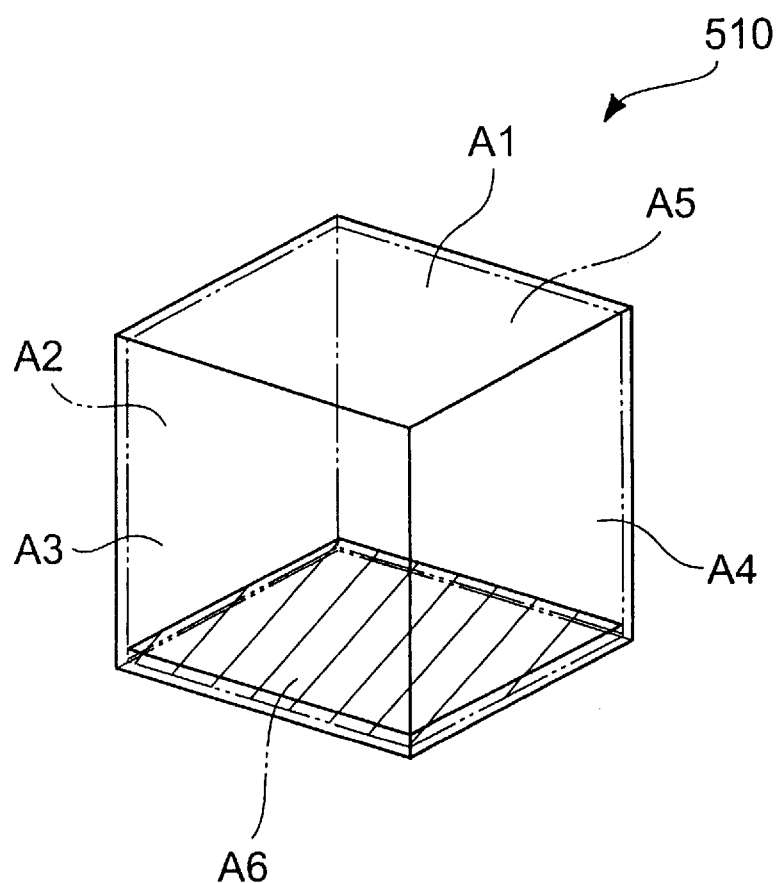
FIG. 9 is a magnified perspective view showing a state that five electrode patterns are in conduction in the position-detecting device used in the mechanical timepiece of the invention (in FIG. 9, the lines showing the thickness of the respective electrodes).

Referring to FIG. 9, the position-detecting device 510 is shown in a state that the mechanical timepiece of the invention is positioned in a "horizontal position". In the state shown in FIG. 9, the electrode A2, the electrode A3, the electrode A4, the electrode A5 and the electrode A6 are short-circuited (or in conduction with one another) by the conductive fluid 530.

Figure 10:
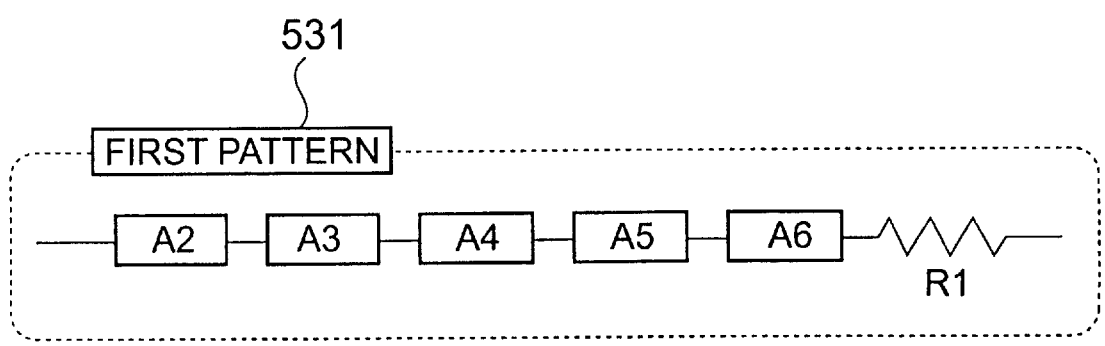
FIG. 10 is a circuit connection diagram in a state five electrode patterns are in conduction in the position-detecting device used in the mechanical timepiece of the invention.

Referring to FIG. 10, in the state shown in FIG. 9, in the circuit block 520, a first pattern 531 is formed such that a resistance R1 is connected in series with the electrode A2, electrode A3, electrode A4, electrode A5 and electrode A6 when the electrode A2, the electrode A3, the electrode A4, the electrode A5 and the electrode A6 are in conduction with one another. In this state shown in FIG. 9, the resistance R1 is structured to be connected in series to the four coils 180, 180a, 180b, 180c by the first pattern 531.

Figure 11:
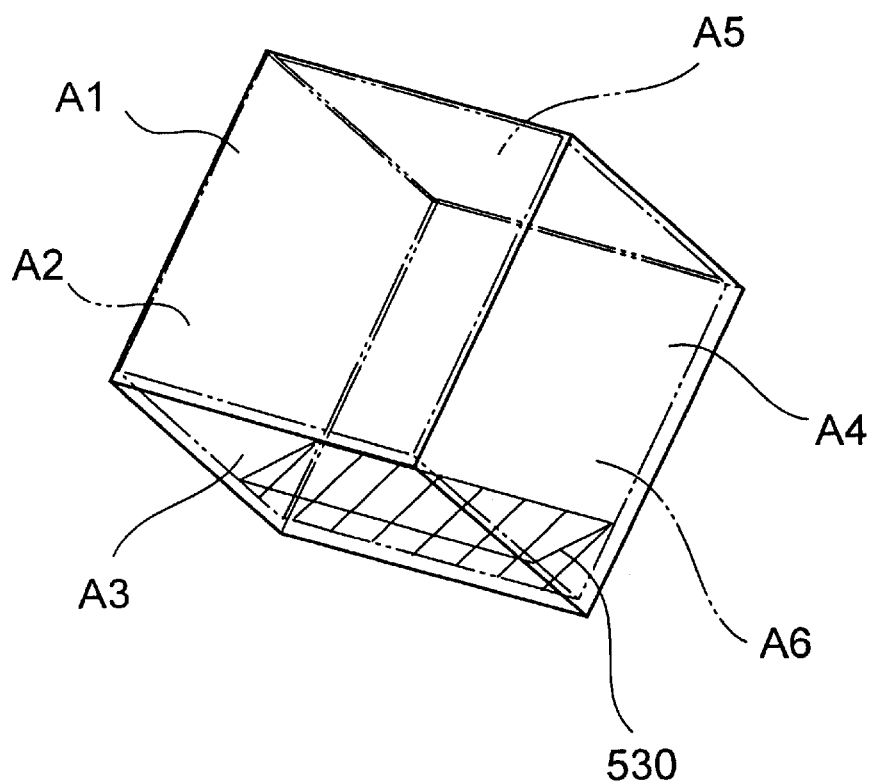
FIG. 11 is a magnified perspective view showing a state four electrode patterns are in conduction in the position-detecting device used in the mechanical timepiece of the invention.

Referring to FIG. 11, the position-detecting device 510 is shown in a state when the mechanical timepiece of the invention is positioned with the dial tilted 45 degrees relative to a horizontal plane. In this state shown in FIG. 9, the electrodes A2, the electrode A3, the electrode A4 and the electrode A6 are short-circuited (or in conduction with one another) by the conductive fluid 530.

Figure 12:
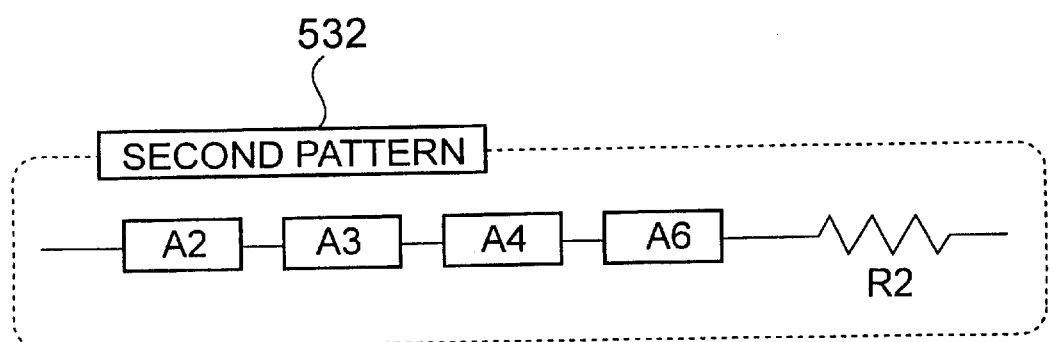
FIG. 12 is a circuit connection diagram in a state four electrode patterns are in conduction in the position-detecting device used in the mechanical timepiece of the invention.

Referring to FIG. 12, in a state shown in FIG. 11, in the circuit block, a second pattern 532 is formed such that a resistance R2 is connected in series with the electrode A2, electrode A3, electrode A4 and electrode A6 when the electrode A2, the electrode A3, the electrode A4, the electrode A6 are in conduction with one another. In this state shown in FIG. 11, in the circuit block 520, the resistance R2 is structured to be connected in series to the four coils 180, 180a, 180b, 180c by the second pattern 532.

Figure 13:
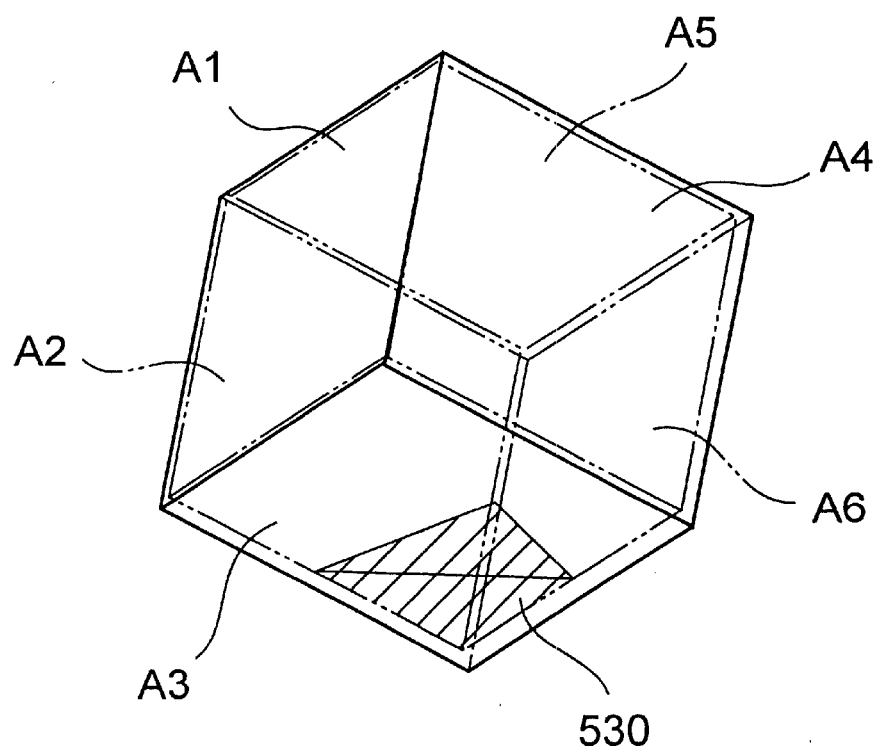
FIG. 13 is a magnified perspective view showing a state three electrode patterns are in conduction in the position-detecting device used in the mechanical timepiece of the invention.

Referring to FIG. 13, the position-detecting device 510 is shown in a state when the mechanical timepiece of the invention is positioned in a direction different from the state shown in FIG. 11 and with the dial tilted 45 degrees relative to a horizontal plane. In this state shown in FIG. 13, the electrode A2, the electrode A3, and the electrode A6 are short-circuited (or in conduction with one another) by the conductive fluid 530.

Figure 14:
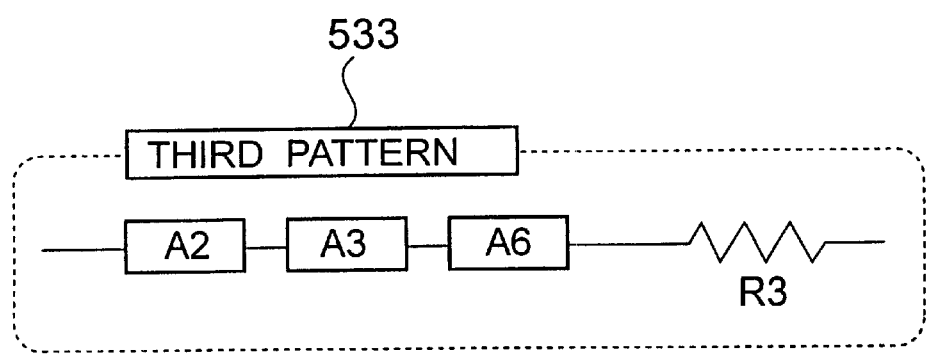
FIG. 14 is a circuit connection diagram in a state three electrode patterns are in conduction in the position-detecting device used in the mechanical timepiece of the invention.

Referring to FIG. 14, in the state shown in FIG. 13, in the circuit block 520, a third pattern 533 is formed such that a resistance R3 is connected in series with the electrode A2, electrode A3 and electrode A6 when the electrode A2, the electrode A3 and the electrode A6 are in conduction with one another. In the state shown in FIG. 13, the resistance R3 is structured to be connected in series to the four coils 180, 180a, 180b, 180c by the third pattern 533.

Referring to FIG. 15, there is shown a relationship between a conduction state of various electrode patterns and a resistance value provided in the circuit in the first embodiment of the position-detecting device used in the mechanical timepiece of the invention.

It is assumed that in FIG. 15 the rotation angle about the X axis is taken as α and the rotation angle about the Y axis as β. At this time, the rotation angle about the Z axis is arbitrary.

It should be noted that, in the numerals of positions shown in FIG. 15, a position state to be detected differs depending on an amount of the conductive fluid.

In FIG. 15, A1, A2, A3, A4, A5 and A6 respectively denote the electrode A2, the electrode A3, the electrode A4, the electrode A5 and the electrode A6. "ON" represents a state that the electrode concerned is in a state of out of conduction to any other electrode. "OFF" represents a state that the electrode is not in conduction eith any of the electrodes.

(Position State 1)

Position state 1 shown in FIG. 15 corresponds to a state that the mechanical timepiece of the invention is in a "horizontal position" state. This position state 1 corresponds to a state that α is in a range of from minus 7 degrees to plus 7 degrees and β is in a range of from minus 7 degrees to plus 7 degrees.

In this position state 1, in the circuit block 520, the electrode A2, the electrode A3, the electrode A4, the electrode A5 and the electrode A6 are structurally in conduction with one another and the resistance R1 is connected in series with the electrode A2, electrode A3, electrode A4, electrode A5 and electrode A6. In this position state 1, the resistance R1 is structurally connected in series to the four coils 180, 180a, 180b, 180c by the first pattern 531. The value of the resistance R1 at this time is taken as a reference value Rref (ohms).

For example, provided that a resultant resistance value of the four coils 180, 180a, 180b, 180c is 1.7 kilo-ohms, the reference value Rref is given 1.2 kilo-ohms.

(Position State 2)

Position state 2 shown in FIG. 15 corresponds to a state that the mechanical timepiece of the invention is in a "9:00-up (9U) position" state. This position state 2 corresponds to a state that α is in a range of from minus 7 degrees to plus 7 degrees and β is in a range of from plus 83 degrees to plus 97 degrees.

In this position state 2, in the circuit block 520, the electrode A1, the electrode A3, the electrode A4, the electrode A5 and the electrode A6 are structurally in conduction with one another and the resistance R2 (not shown) is connected in series with the electrode A1, electrode A3, electrode A4, electrode A5 and electrode A6. In this position state 2, the resistance R2 is structurally connected in series to the four coils 180, 180a, 180b, 180c. The value of the resistance R2 at this time is structurally given 3.48 times the reference value Rref (ohms) (i.e. 3.48×Rref).

(Position State 3)

Position state 3 shown in FIG. 15 corresponds to a state that the mechanical timepiece of the invention is in a "12:00-up (12U) position" state. This position state 3 corresponds to a state that α is in a range of from plus 83 degrees to plus 97 degrees and β is in a range of from minus 7 degrees to plus 7 degrees.

In this position state 3, in the circuit block 520, the electrode A1, the electrode A2, the electrode A4, the electrode A5 and the electrode A6 are structurally in conduction with one another and the resistance R2 (not shown) is connected in series with the electrode A1, electrode A2, electrode A4, electrode A5 and electrode A6. In this position state 3, the resistance R2 is structurally connected in series to the four coils 180, 180a, 180b, 180c. The value of the resistance R2 at this time is structurally given 3.48 times the reference value Rref (ohms) (i.e. 3.48×Rref).

(Position State 4)

Position state 4 shown in FIG. 15 corresponds to a state that the mechanical timepiece of the invention is in a "3:00-up (3U) position" state. This position state 4 corresponds to a state that α is in a range of from minus 7 degrees to plus 7 degrees and β is in a range of from minus 83 degrees to minus 97 degrees.

In this position state 4, in the circuit block 520, the electrode A1, the electrode A2, the electrode A3, the electrode A5 and the electrode A6 are structurally in conduction with one another and the resistance R2 (not shown) is connected in series with the electrode A1, electrode A2, electrode A3, electrode A5 and electrode A6. In this position state 4, the resistance R2 is structurally connected in series to the four coils 180, 180a, 180b, 180c. The value of the resistance R2 at this time is structurally given 3.48 times the reference value Rref (ohms) (i.e. 3.48×Rref).

(Position State 5)

Position state 5 shown in FIG. 15 corresponds to a state that the mechanical timepiece of the invention is in a "6:00-up (6U) position" state. This position state 5 corresponds to a state that α is in a range of from minus 83 degrees to minus 97 degrees and β is in a range of from minus 7 degrees to plus 7 degrees.

In this position state 5, in the circuit block 520, the electrode A1, the electrode A2, the electrode A3, the electrode A4 and the electrode A6 are structurally in conduction with one another and the resistance R2 (not shown) is connected in series with the electrode A1, electrode A2, electrode A3, electrode A4 and electrode A6. In this position state 5, the resistance R2 is structurally connected in series to the four coils 180, 180a, 180b, 180c. The value of the resistance R2 at this time is structurally given 3.48 times the reference value Rref (ohms) (i.e. 3.48×Rref).

(Position State 6)

Position state 6 shown in FIG. 15 corresponds to a state that the mechanical timepiece of the invention is in a back horizontal position" state. This position state 6 corresponds to a state that α is in a range of from plus 173 degrees to plus 187 degrees and β is in a range of from minus 7 degrees to plus 7 degrees.

In this position state 6, in the circuit block 520, the electrode A1, the electrode A2, the electrode A3, the electrode A4 and the electrode A5 are structurally in conduction with one another and the resistance R2 (not shown) is connected in series with the electrode A1, the electrode A2, electrode A3, electrode A4 and electrode A5. In this position state 6, the resistance R2 is structurally connected in series to the four coils 180, 180a, 180b, 180c. The value of the resistance R2 at this time is structurally given as 3.48 times the reference value Rref (ohms) (i.e. 3.48×Rref).

(Position States 7 to 18)

Position states 7 to 18 shown in FIG. 15 correspond to states that the mechanical timepiece of the invention is not in a "horizontal position, not in a "back horizontal state" and not in a "standing position".

The position state 7 corresponds to a state that α is in a range of from minus 7 degrees to minus 83 degrees and β is in a range of from minus 7 degrees to plus 7 degrees.

In this position state 7, in the circuit block 520, the electrode A2, the electrode A3, the electrode A4 and the electrode A6 are structurally in conduction with one another and the resistance R3 (not shown) is connected in series with the electrode A2, the electrode A3, electrode A4 and electrode A6. In this position state 7, the resistance R3 is structurally connected in series to the four coils 180, 180a, 180b, 180c. The value of the resistance R3 at this time is structurally given as 1.83 times the reference valye Rref (ohms) (i.e. 1.83×Rref).

Similarly, in position states 8 to 18, the resistance R3 is structurally connected in series to the four coils 180, 180a, 180b, 180c.

(Position States 19 to 26)

Position states 19 to 26 shown in FIG. 15 correspond to states that the dial of the mechanical timepiece of the invention is in a vertical position.

The position state 19 corresponds to a case that α is in a range of from minus 7 degrees to minus 83 degrees and β is in a range of from minus 7 degrees to minus 83 degrees.

In this position state 19, in the circuit block 520, the electrode A2, the electrode A3 and the electrode A6 are structurally in conduction with one another and the resistance R2 (not shown) is connected in series with the electrode A2, electrode A3 and electrode A6. In this position state 19, the resistance R2 is structurally connected in series to the four coils 180, 180a, 180b, 180c. The value of the resistance R2 at this time is structurally given as 3.48 times the reference value Rref (ohms) (i.e. 3.48×Rref).

Similarly, in position states 20 to 26 as shown in FIG. 15, the resistance R2 is structurally connected in series to the four coils 180, 180a, 180b, 180c.

The resistance reference value Rref is determined by taking into consideration a brake force of the balance with hairspring 140 to suppress rotation of the balance with hairspring 140, hereinafter described. The resistance reference value Rref may be determined by calculation or experiments.

(3.2) Other Embodiments of Position-detecting Device

Next, explanation will be made on structures of other embodiments of the position-detecting device used in the mechanical timepiece of the invention.

Figure 19:
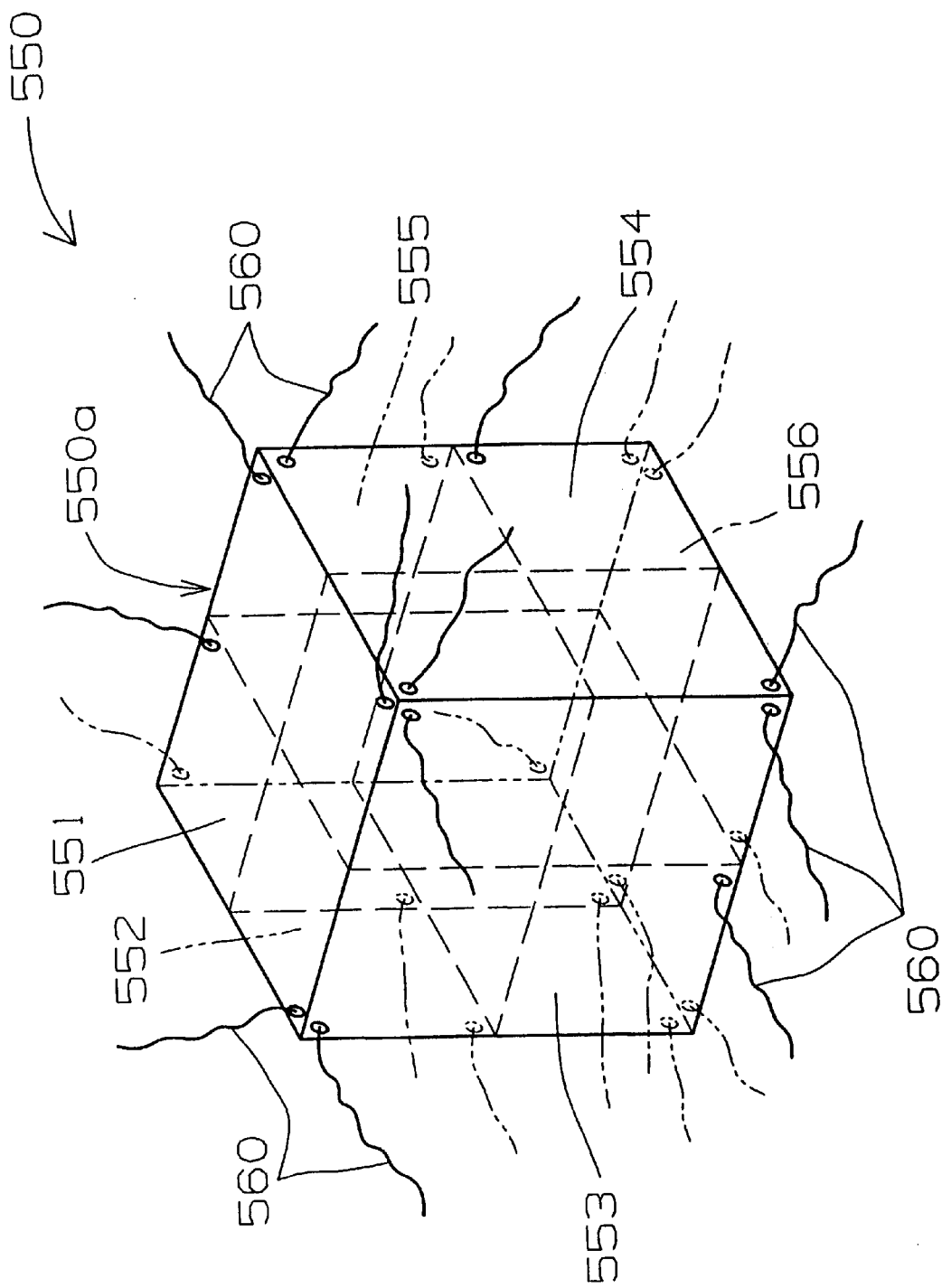
FIG. 19 is a magnified perspective view showing a schematic form of another embodiment of a position-detecting device used in the mechanical timepiece of the invention (in FIG. 19, reference numerals for lead wires are partly omitted).

Referring to FIG. 19, a position-detecting device 550 has a case 550a having a nearly cubic form. The case 550a has a top wall 551, four sidewalls 552, 553, 554, 555 and a bottom wall 556.

The case 550a is formed of an insulating material, such as plastic such as polyimide, glass epoxy substrate, quartz or the like.

In the case 550a, the top wall 551 is orthogonal to each sidewall 552, 553, 554, 555.

The bottom wall 556 is orthogonal to each sidewall 552, 553, 554, 555.

The sidewall 552 is perpendicular to the sidewall 553 and the sidewall 555.

The sidewall 554 is perpendicular to the sidewall 553 and the sidewall 555.

Figure 20:
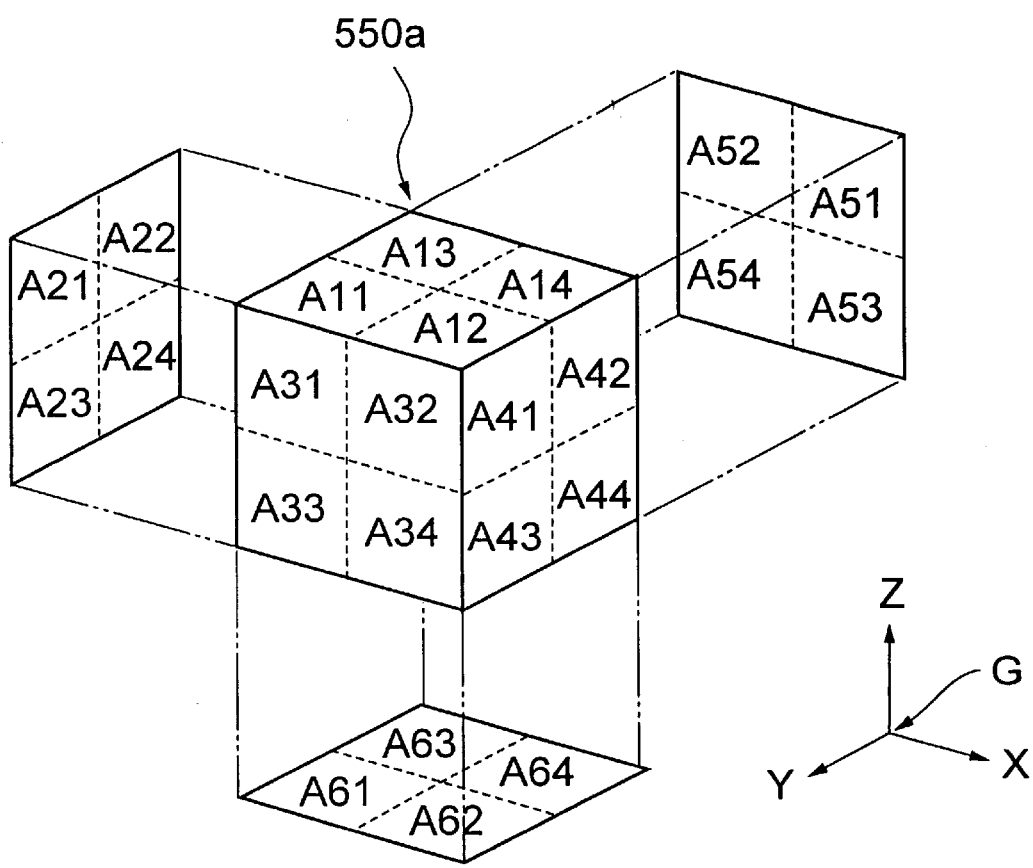
FIG. 20 is a magnified perspective view showing a schematic form of an electrode pattern in another embodiment of a position-detecting device used in the mechanical timepiece of the invention.

Referring to FIG. 20, four electrodes A11, A12, A13, A14 are provided on an inner surface of the top wall 551. The four electrodes A11, A12, A13, A14 have square forms almost same in size and insulated from one another.

Four electrodes A21, A22, A23, A24 are provided on an inner surface of the sidewall 552. The four electrodes A21, A22, A23, A24 have square forms almost same in size and insulated from one another.

Four electrodes A31, A32, A33, A34 are provided on an inner surface of the sidewall 553. The four electrodes A31, A32, A33, A34 have square forms almost same in size and insulated from one another.

Four electrodes A41, A42, A43, A44 are provided on an inner surface of the sidewall 554. The four electrodes A41, A42, A43, A44 have square forms almost same in size and insulated from one another.

Four electrodes A51, A52, A53, A54 are provided on an inner surface of the sidewall 554. The four electrodes A51, A52, A53, A54 have square forms almost same in size and insulated from one another.

Four electrodes A61, A62, A63, A64 are provided on an inner surface of the sidewall 556. The four electrodes A61, A62, A63, A64 have square forms almost same in size and insulated from one another.

In order to facilitate understanding of explanation, in FIG. 20 the electrodes A21–A24, electrodes A51–A54 and electrodes A61–A64 are depicted separated from the case 550a. However, the electrodes are arranged to structure nearly a cube. Also, the electrodes are arranged with spacing. That is, the electrodes are insulated from one another.

In FIG. 20, a center of gravity G of the cube of the case 550a is defined as an origin of a coordinate similarly to FIG. 8 stated before. Definition is made on an X axis, X-axis positive direction, Y axis, Y-axis positive direction, Z axis and Z-axis positive direction, similarly to FIG. 8.

In the embodiment of the mechanical timepiece of the invention, the position-detecting device 550 is arranged relative to the main plate 102 such that the X and Y axes are in parallel with a surface of the main plate 102 and with a surface of the dial 104. Consequently, the position-detecting device 510 is structured relative to the main plate 102 such that the Z-axis is vertical to the surface of the main plate 102 and to the dial 104.

Referring to FIG. 19, electrode lead wires 560 are respectively connected to the electrodes.

Figure 21:
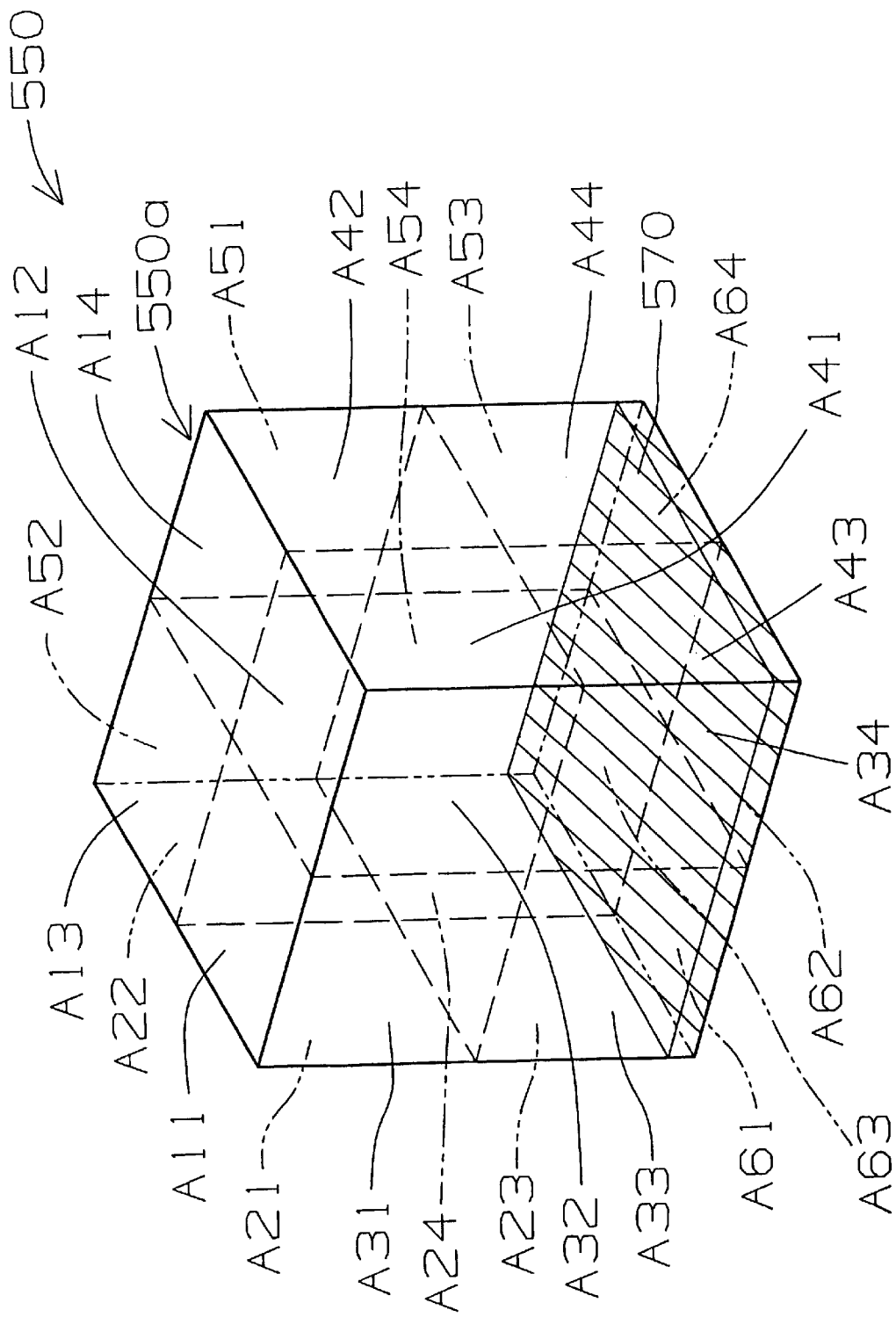
FIG. 21 is a magnified perspective view showing a state twelve electrode patterns are in conduction in another embodiment of a position-detecting device used in the mechanical timepiece of the invention.

Referring to FIG. 21, conductive fluid 570 is accommodated in the case 550a. The conductive fluid 570 is, for example, mercury. Although the volume of the conductive fluid 570, in the example shown in FIG. 21, is ⅛th of a volume of the case 550a, it is preferably ⅛th to ⅓₄th of the volume of the case 550a.

The state shown in FIG. 21 shows a state of the position-detecting device 510 when the mechanical timepiece of the invention is placed in a "horizontal position". In the state shown in FIG. 21, the conductive fluid 570 is in contact with the electrode A23, electrode A24, electrode A33, electrode A34, electrode A43, electrode A44, electrode A53, electrode A54, electrode A61, electrode A62, electrode A63 and electrode A64, but out of contact with other electrodes. Consequently, in the state shown in FIG. 21, the electrode A23, the electrode A24, the electrode A33, the electrode A34, the electrode A43, the electrode A44, the electrode A53, the electrode A54, the electrode A61, the electrode A62, the electrode A63 and the electrode A64 are short-circuited (or in conduction with one another) by the conductive fluid 570.

Figure 22:
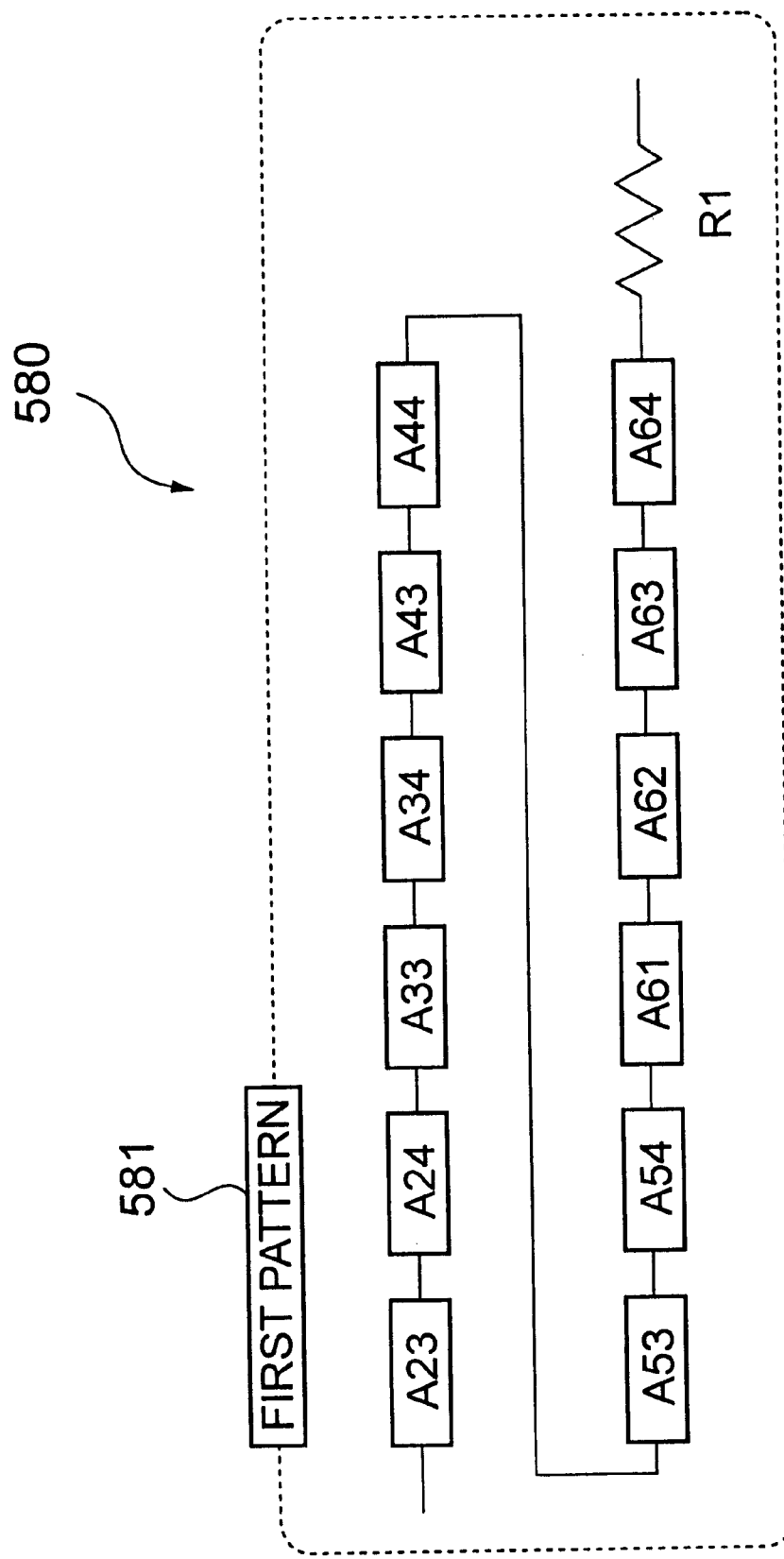
FIG. 22 is a circuit connection diagram in a state twelve electrode patterns are in conduction in another embodiment of a position-detecting device used in the mechanical timepiece of the invention.

Referring to FIG. 22, in the state shown in FIG. 9, in the circuit block 580 a first pattern 581 is formed such that, when the electrode A23, the electrode A24, the electrode A33, the electrode A34, the electrode A43, the electrode A44, the electrode A53, the electrode A54, the electrode A61, the electrode A62, the electrode A63 and the electrode A64 are in conduction with one another, the resistance R1 is connected in series to these electrode. In the state shown in FIG. 22, the resistance R1 is structurally connected in series to the four coils 180, 180a, 180b, 180c by the first pattern 581.

Figure 23:
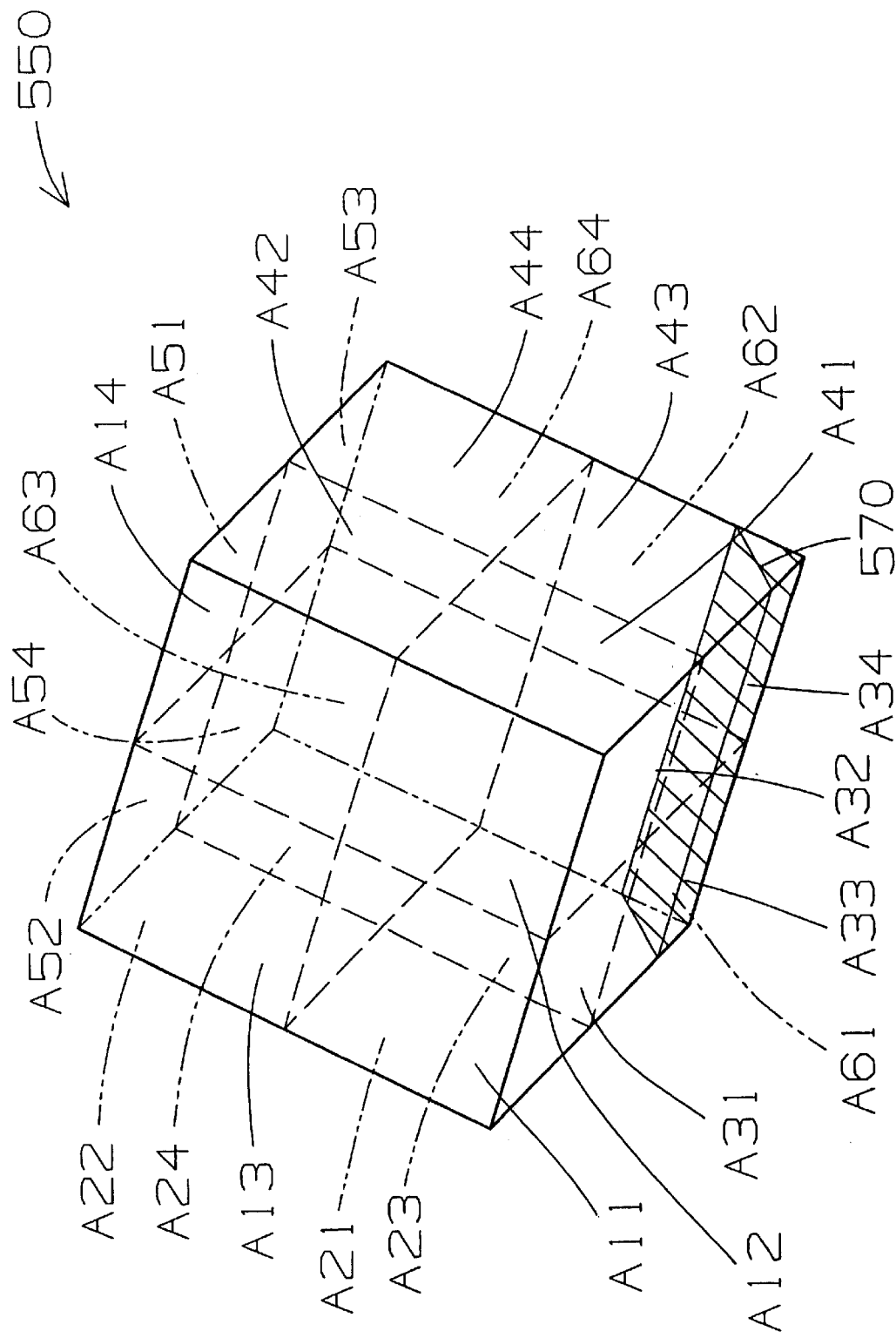
FIG. 23 is a magnified perspective view showing a state six electrode patterns are in conduction in another embodiment of a position-detecting device used in the mechanical timepiece of the invention.

Referring to FIG. 23, there is shown a state of the position-detecting device 550 when the mechanical timepiece of the invention is placed with the dial tilted 45 degrees relative to the horizontal plane. In the state shown in FIG. 23, the electrode A23, the electrode A33, the electrode A34, the electrode A43, the electrode A61 and the electrode A62 are short-circuited (or in conduction with one another) by the conductive fluid 570.

Figure 24:
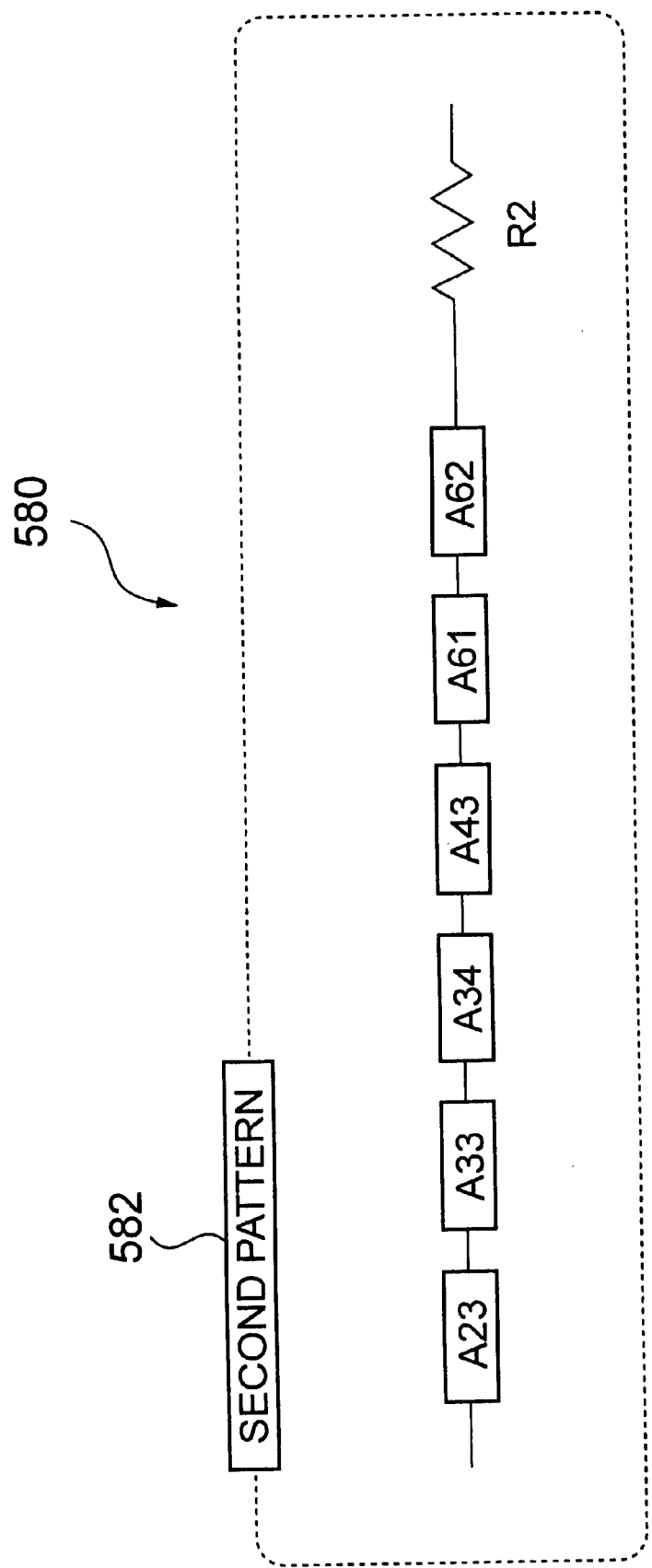
FIG. 24 is a circuit connection diagram in a state six electrode patterns are in conduction in another embodiment of a position-detecting device used in the mechanical timepiece of the invention.

Referring to FIG. 24, in the state shown in FIG. 23, in the circuit block 580 a second pattern 582 is formed such that, when the electrode A23, the electrode A33, the electrode A34, the electrode A43, the electrode A61 and the electrode A62 are in conduction with one another, the resistance R2 is connected in series to these electrode. In the state shown in FIG. 23, the resistance R2 is structurally connected in series to the four coils 180, 180a, 180b, 180c by the second pattern 582.

Figure 25:
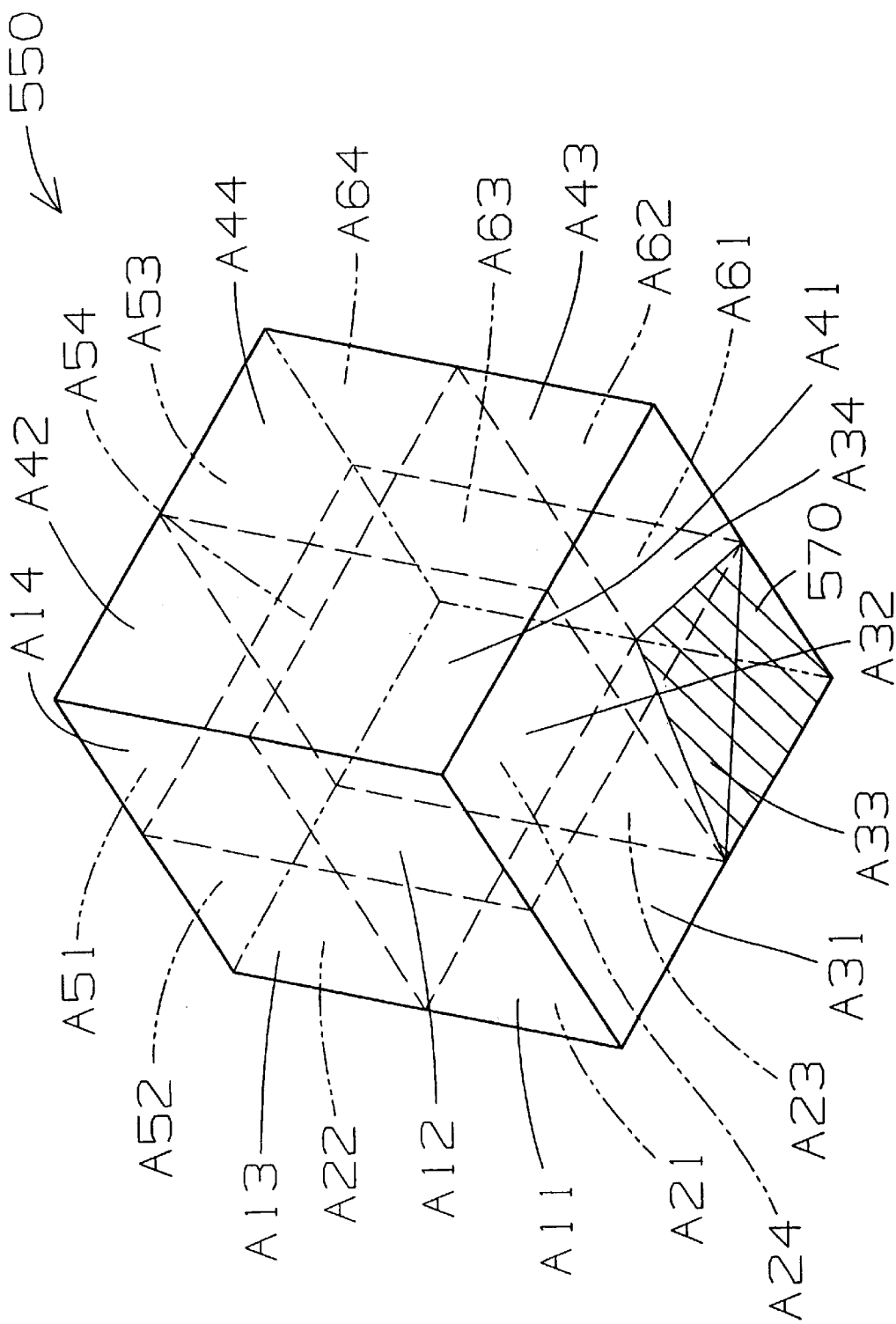
FIG. 25 is a magnified perspective view showing a state three electrode patterns are in conduction in another embodiment of a position-detecting device used in the mechanical timepiece of the invention.

Referring to FIG. 25, there is shown another state of the position-detecting device 550 when the mechanical timepiece of the invention is placed in a different state from the state shown in FIG. 23 with the dial tilted 45 degrees relative to the horizontal plane. In the state shown in FIG. 25, the electrode A23, the electrode A33 and the electrode A61 are short-circuited (or in conduction with one another) by the conductive fluid 570.

Figure 26:
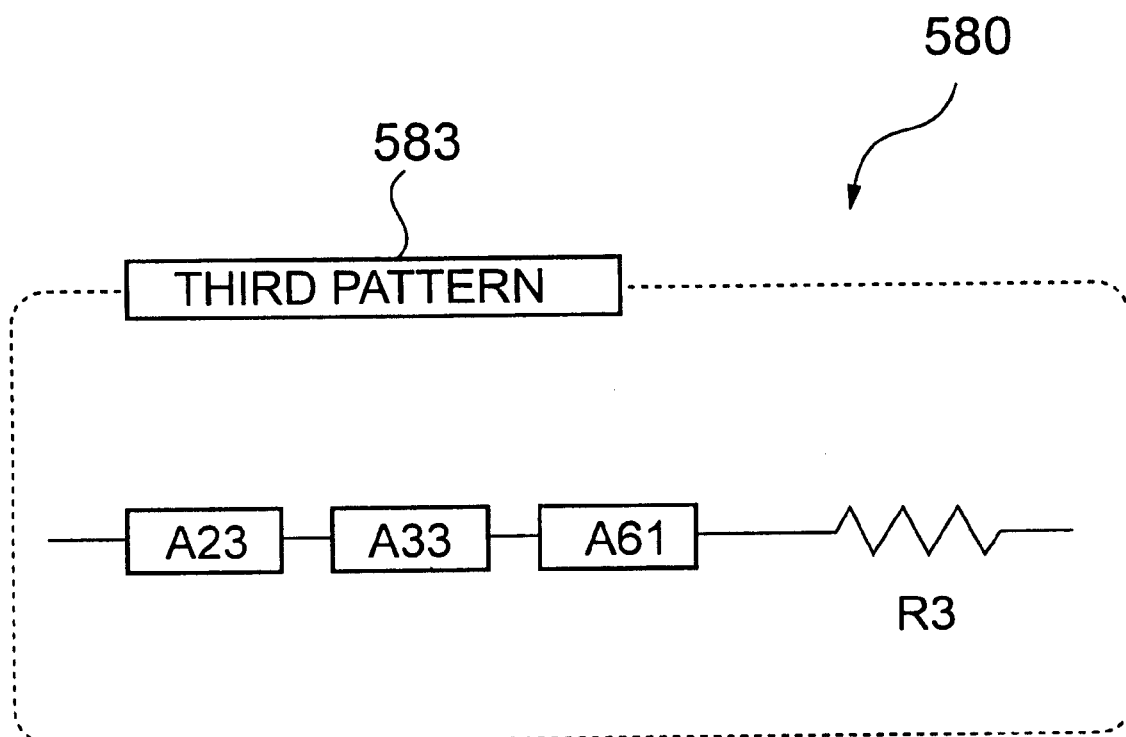
FIG. 26 is a circuit connection diagram in a state three electrode patterns are in conduction in another embodiment of a position-detecting device used in the mechanical timepiece of the invention.

Referring to FIG. 26, in the state shown in FIG. 25, in the circuit block 580 a third pattern 583 is formed such that, when the electrode A23, the electrode A33 and the electrode A61 are in conduction with one another, the resistance R3 is connected in series to these electrode. In the state shown in FIG. 25, the resistance R3 is structurally connected in series to the four coils 180, 180a, 180b, 180c by the third pattern 583.

Concerning the position-detecting device 550 like this, similarly to FIG. 15, in the other embodiment of the position-detecting device used in the mechanical timepiece of the invention, it is possible to prepare a list of a relationship between a conduction state of various electrode patterns and a value of resistance provided in the circuit block (omittedly shown). Accordingly, a circuit block interconnection and resistance value can be fixed for the other embodiment of the position-detecting device.

(4) Operation of Balance with Hairspring Upon not Energizing Coils

Figure 18:
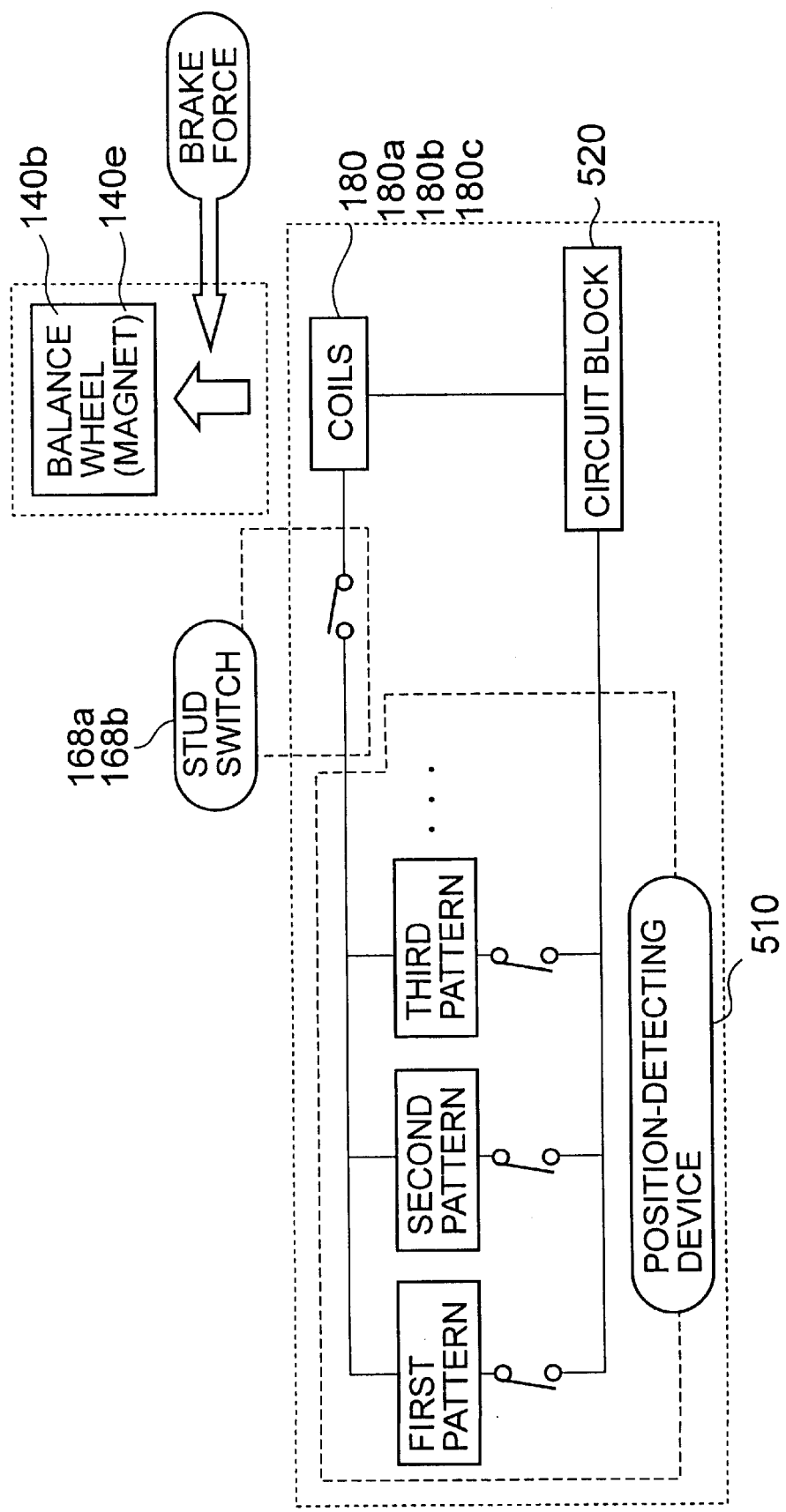
FIG. 18 is a block diagram showing an operation of the position-detecting device in the mechanical timepiece of the invention.

Referring to FIG. 3, FIG. 4 and FIG. 18, explanation will be made on the operation of the balance with hairspring 140 when the coils 180, 180a, 180b, 180c are not energized, i.e. when the circuit is open.

The stud mainspring 140c expands and contracts radially of the stud mainspring 140c depending on a rotation angle of stud mainspring 140 rotation. For example, in the state shown in FIG. 3, when the balance with hairspring rotates clockwise, the stud mainspring 140c contracts in a direction toward a center of the balance with hairspring 140. On the contrary, when the balance with hairspring 140 rotates counterclockwise, the balance with hairspring 140c expands in a direction away from the center of the balance with hairspring 140.

Consequently, in FIG. 4, when the balance with hairspring 140 rotates clockwise, the balance with hairspring 140c operates in a manner approaching the second contact member 168b. Contrary to this, when the balance with hairspring 140 rotates counterclockwise, the stud mainspring 140c operates in a manner approaching the first contact member 168a.

Where the rotation angle of the balance with hairspring 140 (swing angle) is less than a constant threshold, e.g. 180 degrees, the stud mainspring 140c has a less expansion/contraction amount in the radial direction. Consequently, the stud mainspring 140c does not contact the first contact member 168a, and does not contact the second contact member 168b.

Where the rotation angle of the balance with hairspring 140 (swing angle) is equal to or greater than the constant threshold, e.g. 180 degrees, the stud mainspring 140c becomes great in expansion/contraction amount in the radial direction. Consequently, the stud mainspring 140c contacts both the first contact member 168a, and the second contact member 168b.

For example, the stud mainspring 140c at a near-outer-end portion 140ct positions in a gap of approximately 0.04 millimeters between the first contact member 168a and the second contact member 168b. Consequently, in a state that the swing angle of the balance with hairspring 140 is in a range exceeding 0 degree but less than 180 degrees, the near-outer-end portion 140ct of the stud mainspring 140c does not contact the first contact member 168a and does not contact the second contact member 168b. That is, the stud mainspring 140c at its outer end is out of contact with the first contact member 168a and out of contact with the second contact member 168b. Accordingly, the coils 180, 180a, 180b, 180c are not energized so that the magnetic flux on the balance magnet 140e will not have an effect on the coils 180, 180a, 180b, 180c. As a result, the swing angle of the balance with hairspring 140 is free from attenuation due to operation of the balance magnet 140e and coils 180, 180a, 180b, 180c.

(5) Operation of Balance with Hairspring Upon Energizing Coils

Figure 16:
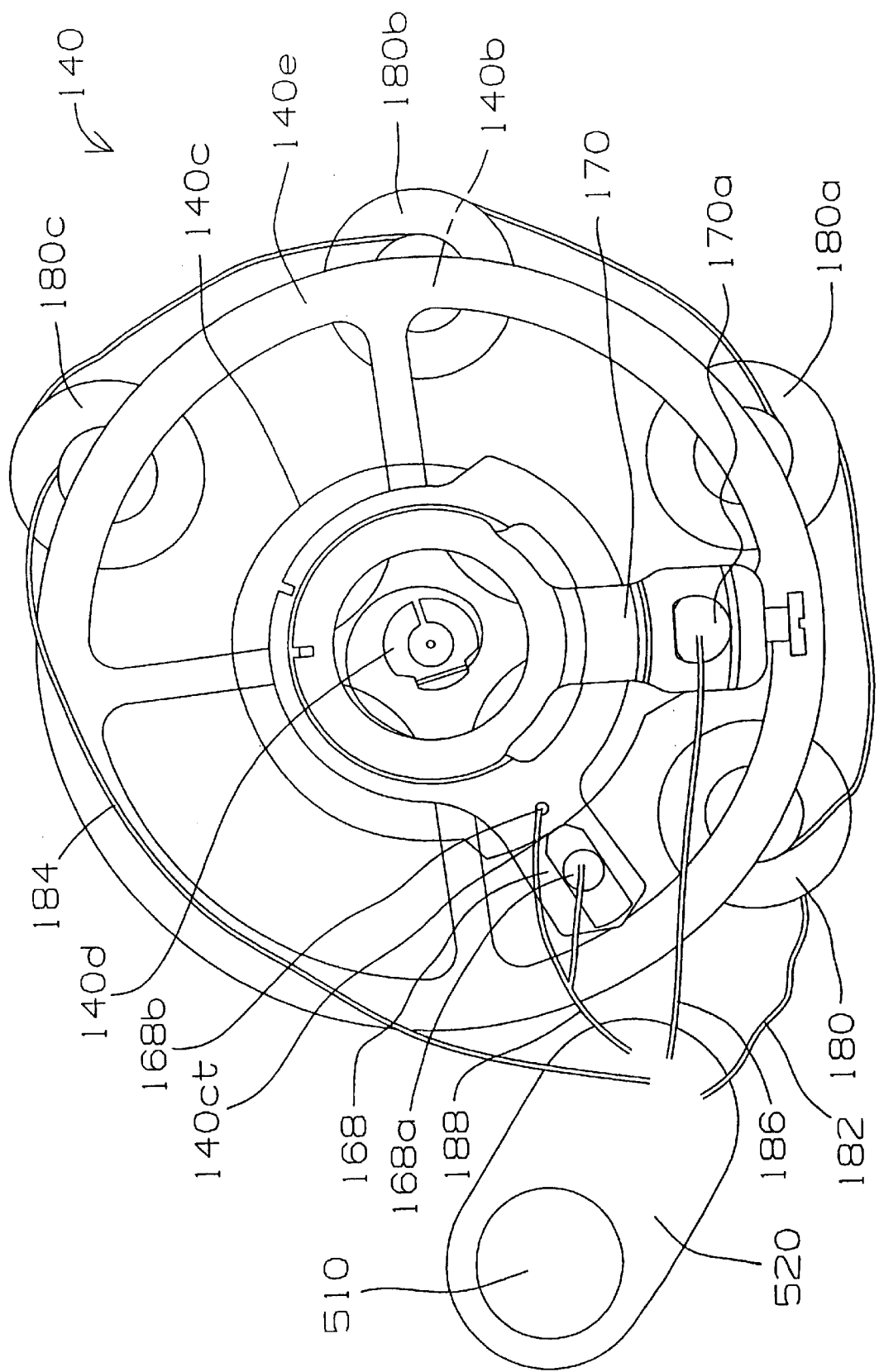

Next, with reference to FIG. 16, FIG. 17 and FIG. 18, explanation will be made on the operation of the balance with hairspring 140 when the coils 180, 180a, 180b, 180c are energized, i.e. when the circuit is close. That is, FIG. 16 and FIG. 17 show a case that the balance with hairspring 140 has a swing angle 180 degrees or greater.

Figure 17:
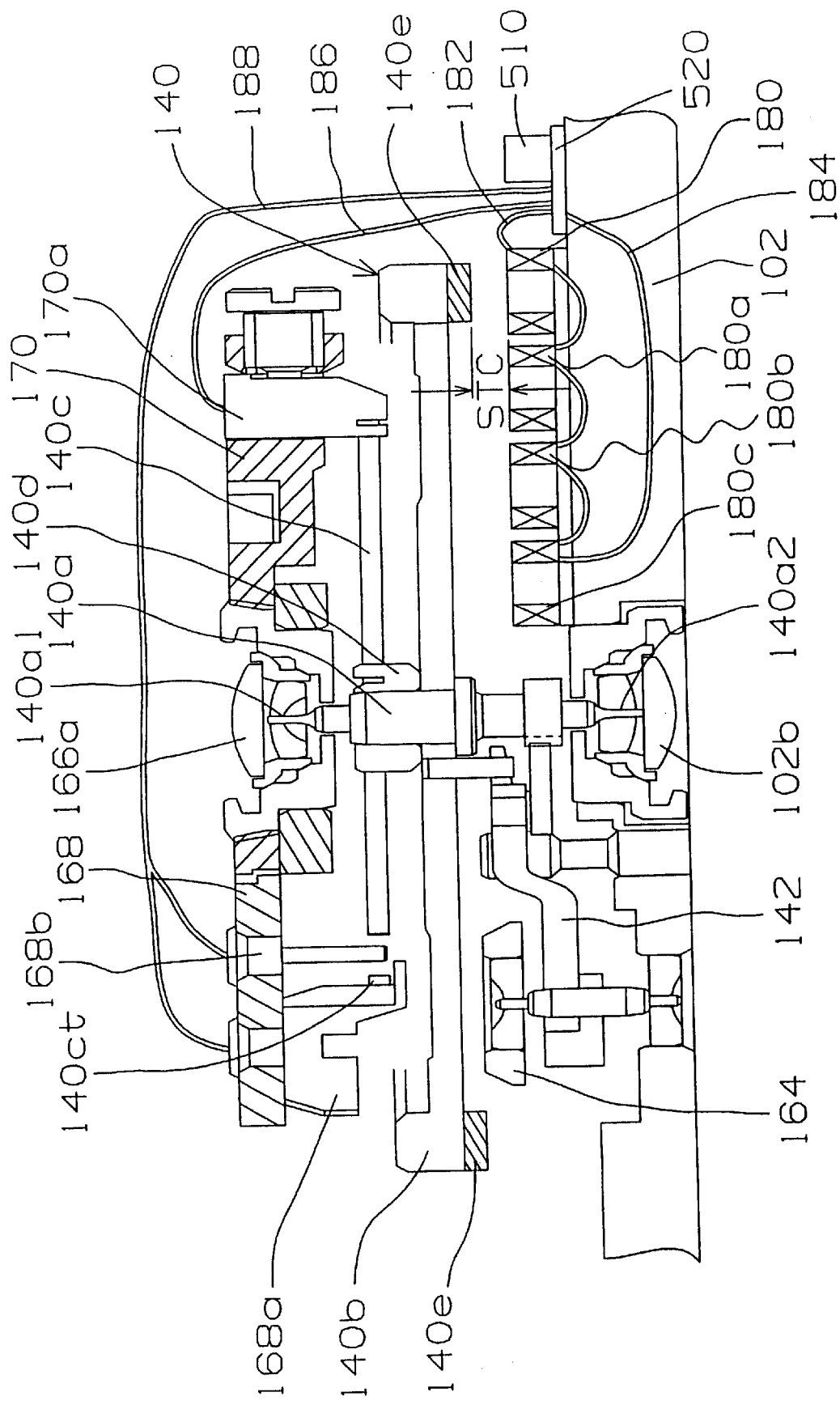

Note that in FIG. 17 the thickness of the stud mainspring 140c (thickness in the radial direction of the balance with hairspring) is exaggeratedly shown.

When the swing angle of the balance with hairspring 140 becomes 180 degrees or greater, the stud mainspring at the near-outer-end portion 140ct contacts the first contact member 168a or the second contact member 168b. In such a state, the coils 180, 180a, 180b, 180c are energized and exerts such a force as suppressing rotational motion of the balance with hairspring 140 due to induction current caused by change of magnetic flux on the balance magnet 140e. Due to this action, a brake force to the balance with hairspring 140 is applied suppressing the balance with hairspring 140 from rotating thereby decreasing the swing angle of the balance with hairspring 140.

When the swing angle of the balance with hairspring 140 decreases down to a range of exceeding 0 degree but less than 180 degrees, the near-outer-end portion 140ct of the stud mainspring 140c becomes a state of out of contact with the first contact member 168a and out of contact with the second contact member 168b. Accordingly, as shown in FIG. 3 and FIG. 4, because the outer end of the stud mainspring 140c is out of contact with the first contact member 168a and out of contact with the second contact member 168b, the coils 180, 180a, 180b, 180c are not energized so that the magnetic flux on the balance magnet 140e does not have an effect on the coil 180, 180a, 180b, 180c.

In a state the mechanical timepiece of the invention is in the "horizontal position" when the coils 180, 180a, 180b, 180c are in conduction, i.e. when the circuit is closed, the resistance R1 is connected in series to the four coils 180, 180a, 180b, 180c. Accordingly, in such a state, the coils 180, 180a, 180b, 180c and the resistance R1 are in conduction. Due to an induction current caused by change in magnetic flux of the balance magnet 140e, such a force as suppressing rotational motion of the balance with hairspring 140 is applied to the balance with hairspring 140. That is, in order to suppress the rotation of the balance with hairspring 140, a brake force with a magnitude corresponding to a value of the resistance Rref (ohms) is applied to the balance with hairspring 140 thereby reducing rotation angle of the balance with hairspring 140.

In a state the mechanical timepiece of the invention is not in a "horizontal position", "back horizontal position" or "standing position" when the coils 180, 180a, 180b 180c are in conduction, i.e. when the circuit is close, the resistance R3 is connected in series to the four coils 180, 180a, 180b, 180c. The value of the resistance R3 at this time is 1.83 times the reference value Rref (ohms) (i.e. 1.83×Rref).

In such a state, the coils 180, 180a, 180b, 180c and the resistance R3 are in conduction. Due to an induction current caused by change in magnetic flux of the balance magnet 140e, such a force as suppressing the rotational motion of the balance with hairspring 140 is applied to the balance with hairspring 140. That is, in order to suppress the rotation of the balance with hairspring 140, a brake force with a magnitude corresponding to the resistance value 1.83×Rref (ohms) is applied to the balance with hairspring 140 thus reducing the swing angle of the balance with hairspring 140.

By thus setting the resistance value, in the mechanical timepiece of the invention the brake force in the state the mechanical timepiece of the invention is not in a "standing position", not in a "horizontal position" or not in an "back position" is structurally made smaller than a brake force in the state the mechanical timepiece of the invention is in a "horizontal position" and "backside-down position". Also, in the mechanical timepiece of the invention the brake force in the state the mechanical timepiece of the invention is not in a "standing position", not in a "horizontal position" or not in an "back horizontal position" is structurally made greater than a brake force in the state the mechanical timepiece of the invention is in a "standing position".

In a state the mechanical timepiece of the invention is in the "standing position" when the coils 180, 180a, 180b, 180c are in conduction, i.e. when the circuit is closed, the resistance R2 is connected in series to the four coils 180, 180a, 180b, 180c. The value of the resistance R2 is 3.48 times the reference value Rref (ohms) (i.e. 3.48×Rref).

In such a state, the coils 180, 180a, 180b, 180c and the resistance R2 are in conduction. Due to an induction current caused by change in magnetic flux of the balance magnet 140e, such a force as suppressing the rotational motion of the balance with hairspring 140 is applied to the balance with hairspring 140. That is, in order to suppress the rotation of the balance with hairspring 140, a brake force with a magnitude corresponding to the resistance value 3.48×Rref (ohms) is applied to the balance with hairspring 140 thus reducing the swing angle of the balance with hairspring 140.

By thus setting the resistance value, in the mechanical timepiece of the invention the brake force in the state the mechanical timepiece of the invention in a "standing position" is structurally made smaller than a brake force in the state the mechanical timepiece of the invention is in a "horizontal position" and "backside-down position".

The mechanical timepiece of the invention thus structured copes with various positions of the mechanical timepiece thereby controlling the rotation angle of the balance with hairspring 140 with extreme accuracy.

The present invention, as explained above, is structured having a balance rotation angle control mechanism in a mechanical timepiece structured including a balance with hairspring that an escape/speed control device repeats right and left rotation, an escape wheel and pinion rotating based on rotation of a front train wheel, and a pallet fork controlling rotation of the escape wheel and pinion based on operation of the balance with hairspring. Accordingly, it is possible to improve the accuracy for the mechanical timepiece without reducing a sustaining time of the mechanical timepiece.

That is, in the invention, an eye is placed on the relationship between instantaneous watch error and swing angle. By keeping the swing angle constant, the watch error is suppressed from changing thus providing adjustment to lessen advancement or delay per day of the timepiece.

Contrary to this, in the conventional mechanical timepiece, swing angle changes with lapse of time due to the relationship between sustaining time and swing angle. Furthermore, instantaneous watch error changes with lapse of time due to the relationship between swing angle and instantaneous watch error.

Due to this, it has been difficult to increase the sustaining time for a timepiece over which constant accuracy is maintained.

(6) Simulation on Instantaneous Watch Error

Next, explanation will be made on a result of simulation concerning watch error conducted on the mechanical timepiece of the invention developed to solve the problem with the conventional mechanical timepiece.

Figure 27:
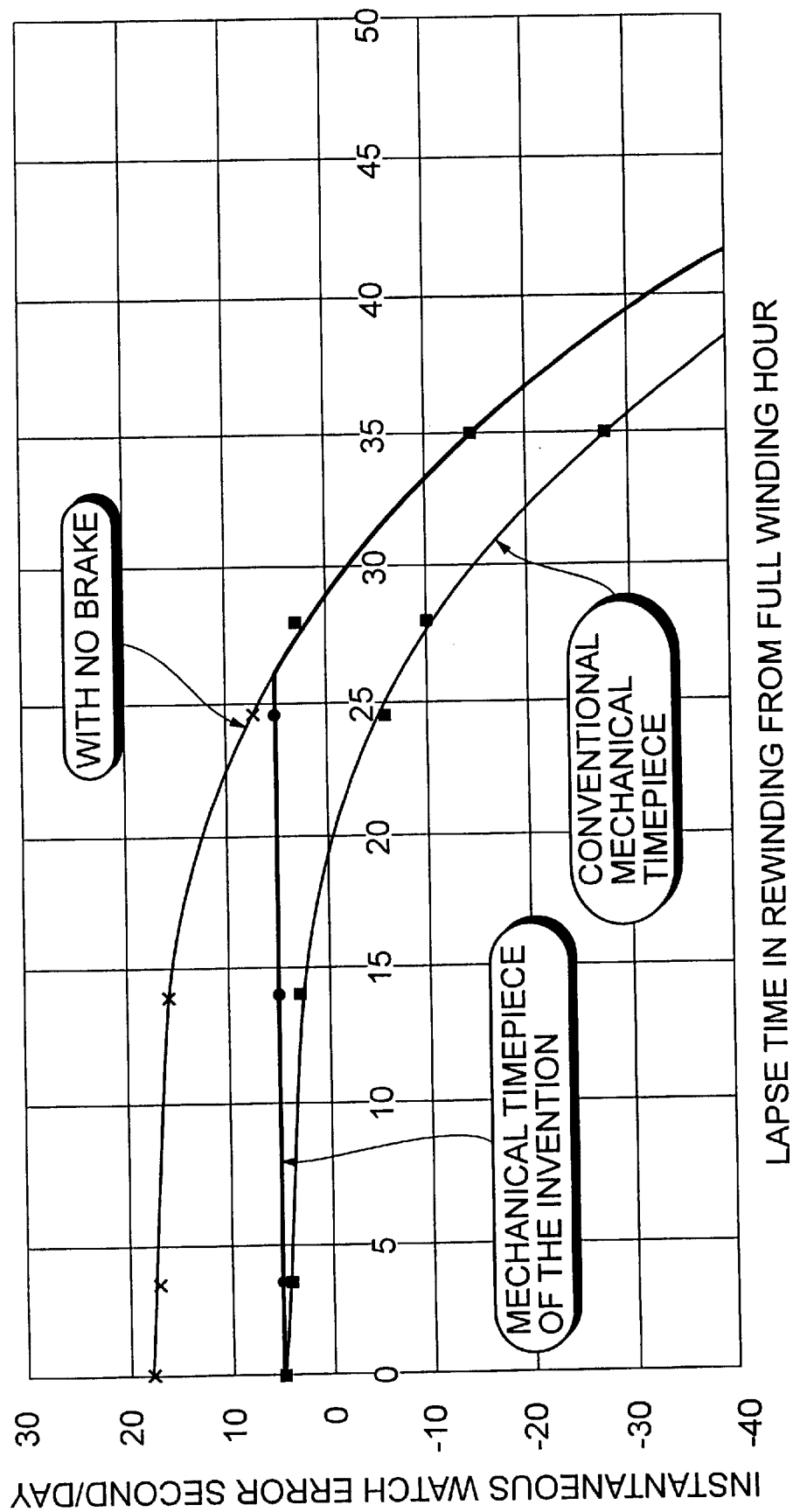
FIG. 27 is a graph schematically showing a relationship between a lapse of time in rewinding from a full winding state and an instantaneous watch error in the mechanical timepiece of the invention and conventional mechanical timepiece.
Figure 28:
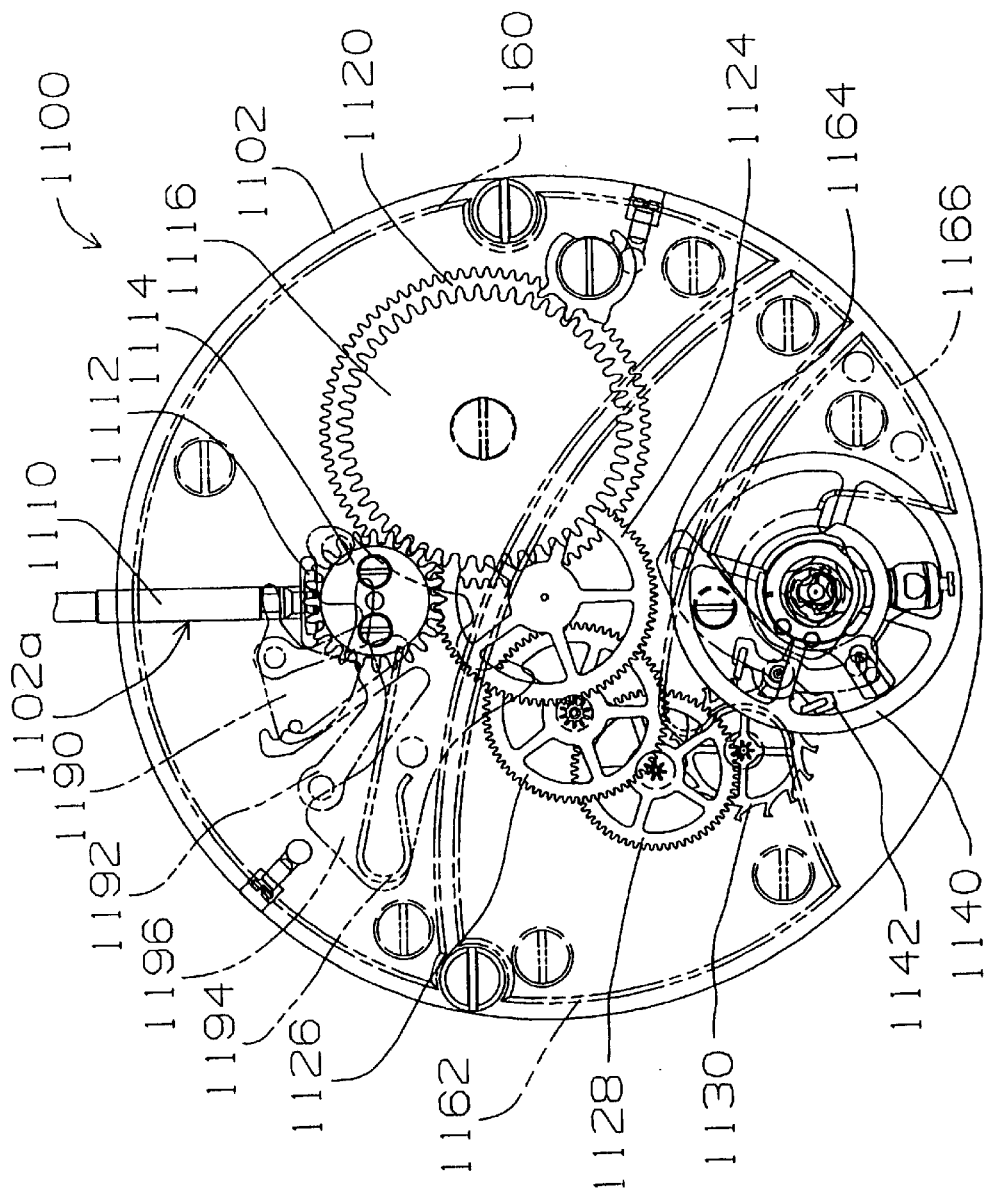
FIG. 28 is a plan view showing a schematic form of a movement front side of a conventional mechanical timepiece (in FIG. 28, parts are partly omitted and bridge members are shown by virtual lines).
Figure 29:
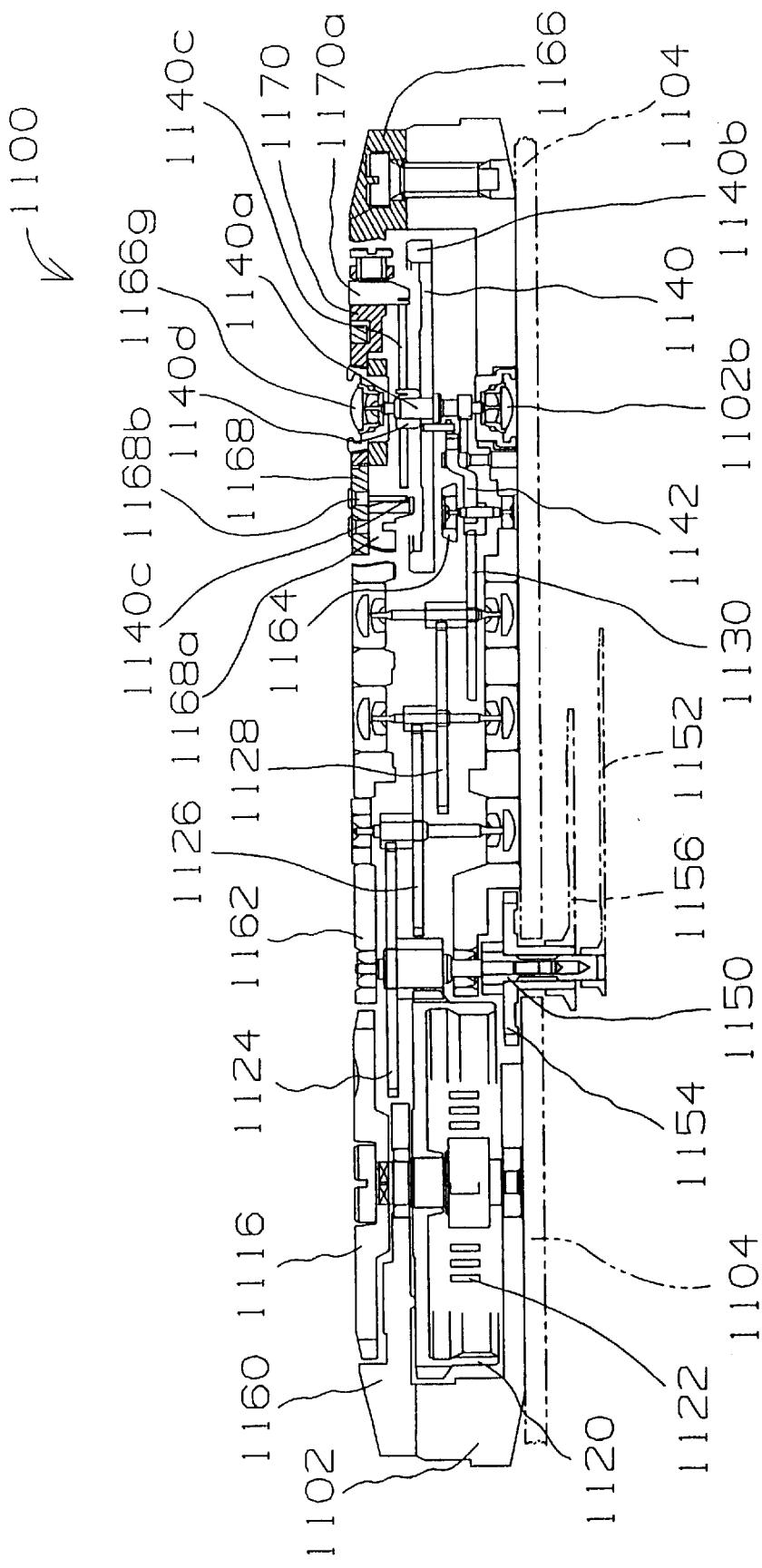
FIG. 29 is a schematic fragmentary sectional view of a movement of a conventional mechanical timepiece (in FIG. 29, parts are partly omitted).
Figure 30:
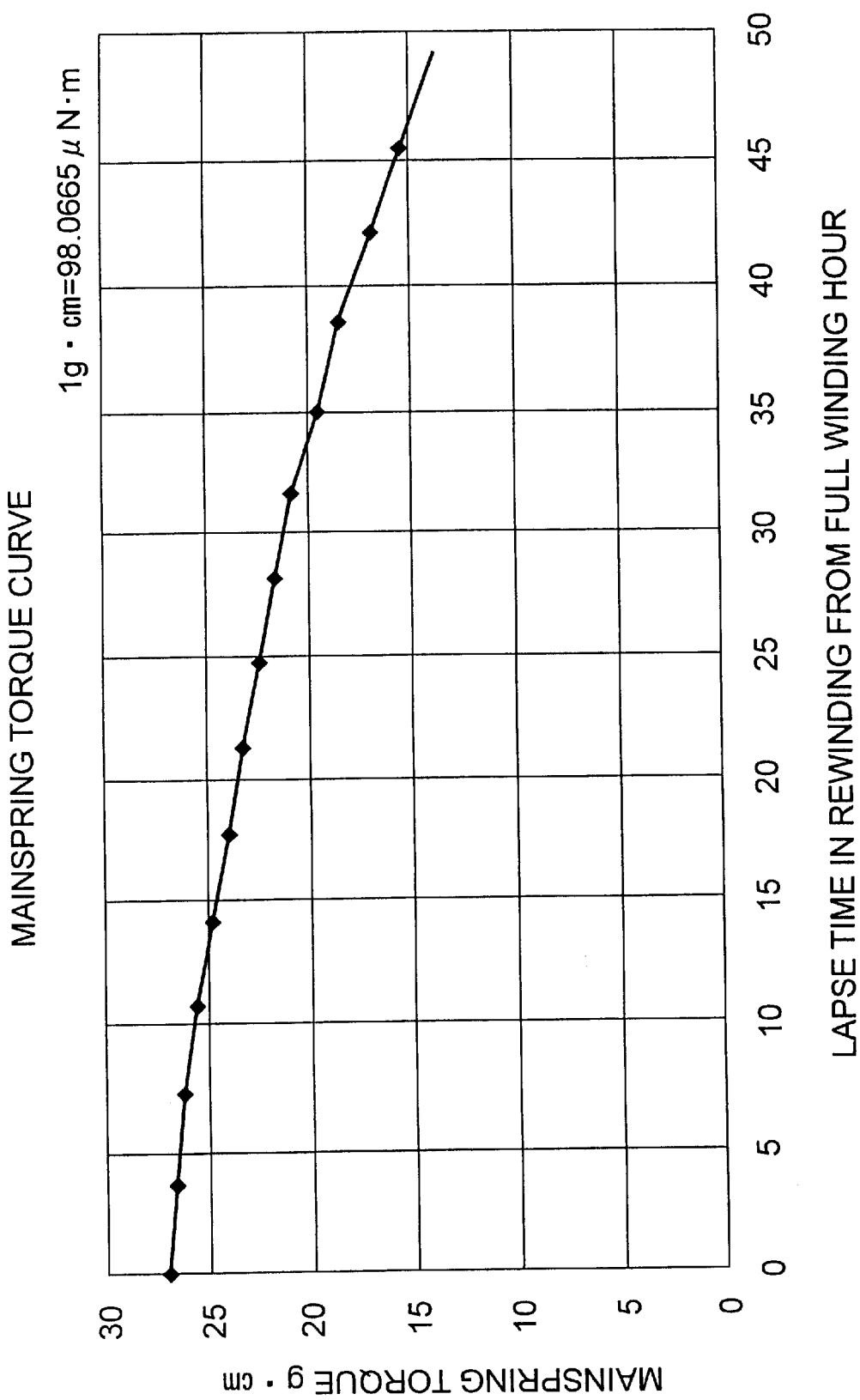
FIG. 30 is a graph schematically showing a relationship between a lapse time of rewinding the mainspring from a full winding state and a mainspring torque in the mechanical timepiece.
Figure 31:
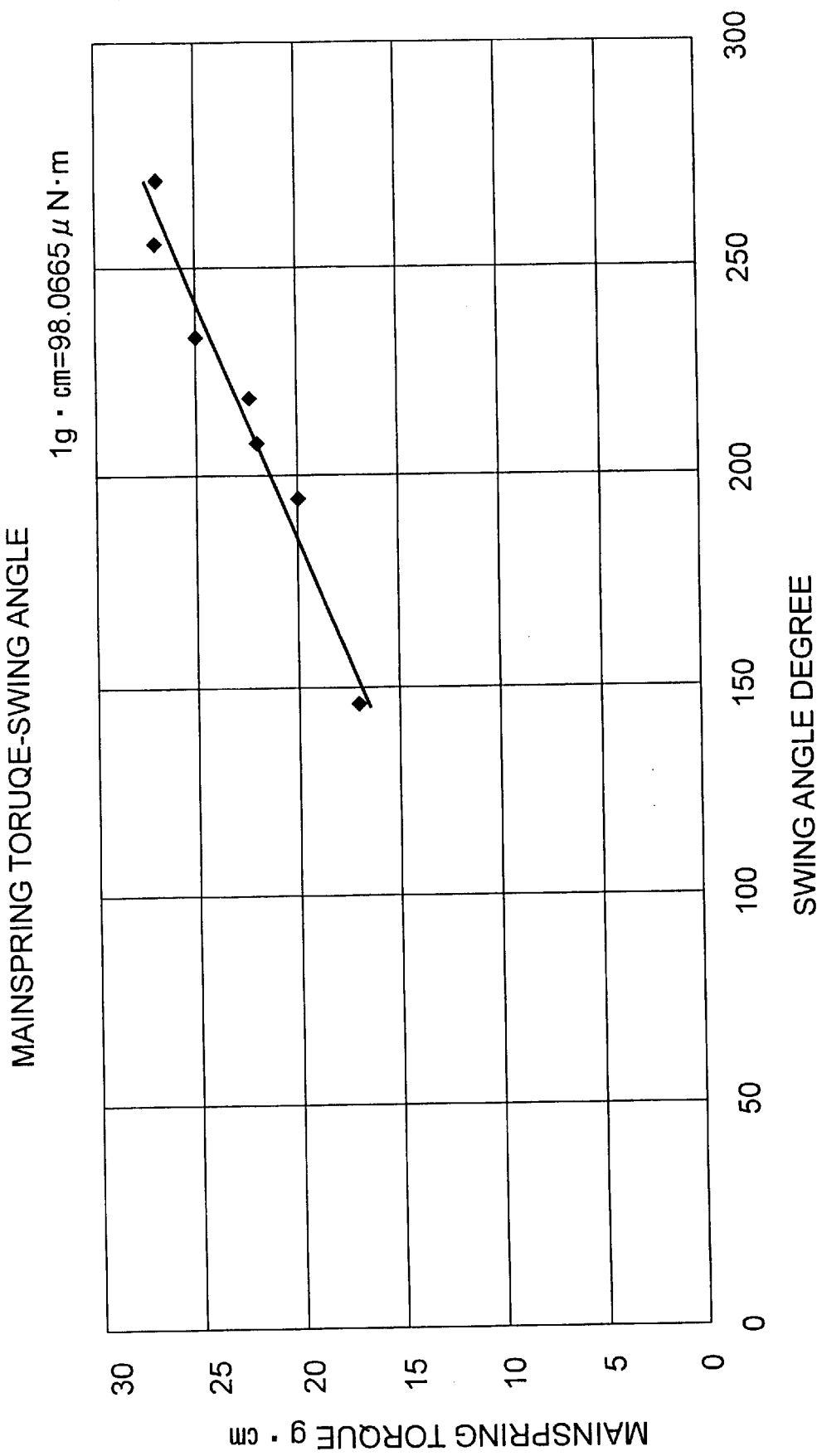
FIG. 31 is a graph schematically showing a relationship between a swing angle of the balance with hairspring and a mainspring torque in the mechanical timepiece.
Figure 32:
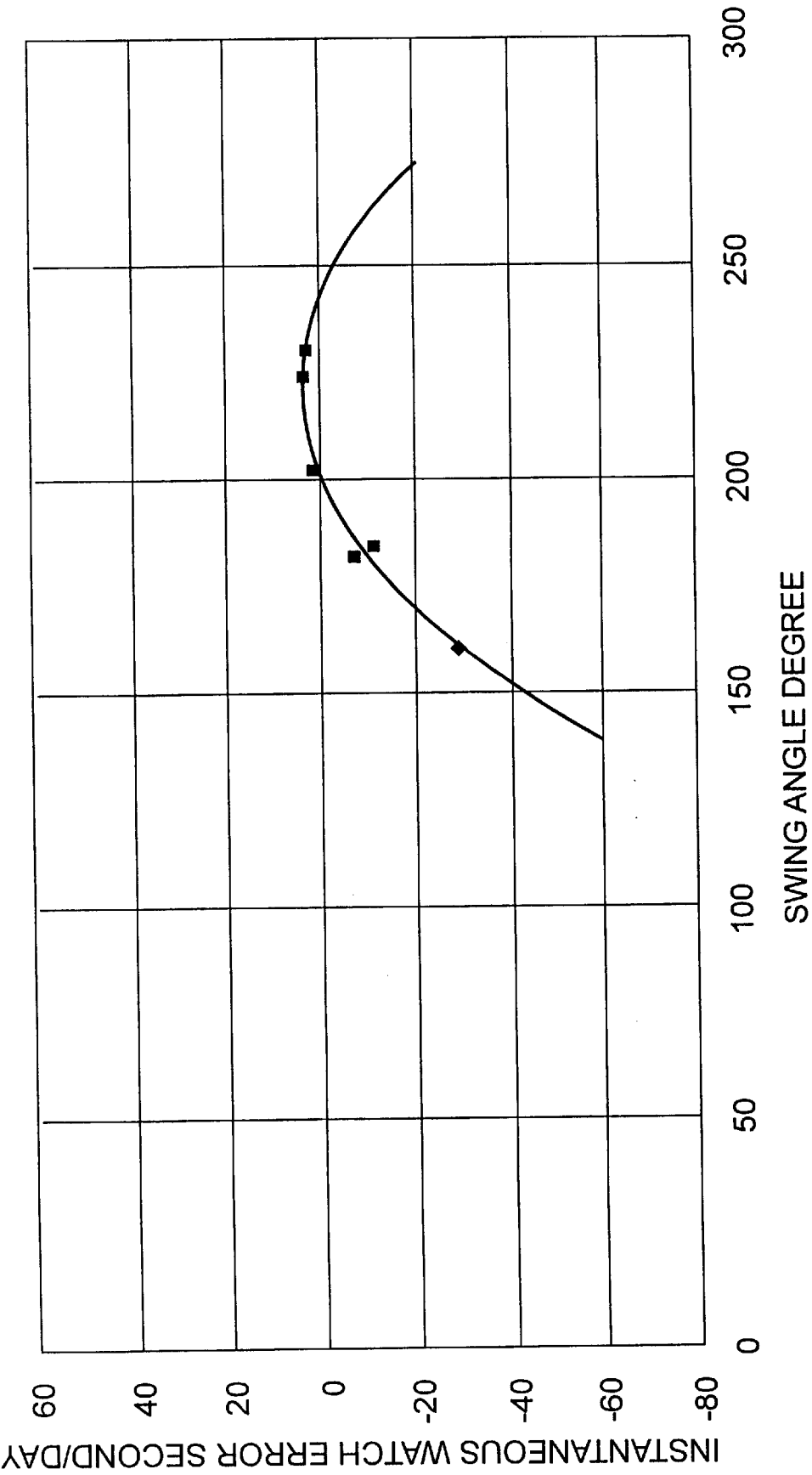
FIG. 32 is a graph schematically showing a relationship between a swing angle of the balance with hairspring and an instantaneous watch error in the mechanical timepiece.

Referring to FIG. 27, in the mechanical timepiece, adjustment is first made to a state the timepiece is advanced in instantaneous watch error as shown by x-marked plotting and thin line in FIG. 27. In the mechanical timepiece, where the balance with hairspring 140 rotates a certain angle or greater, if the stud mainspring 140c at the outer end contacts the first contact member 168a or second contact member 168b, the stud mainspring 140c is shortened in effective length further advancing the instantaneous watch error.

That is, in the mechanical timepiece in a state the stud mainspring 140c at the outer end is out of contact with the first contact member 168a and out of contact with the second contact member 168b, as shown in the x-marked plotting and thin line in FIG. 27 the instantaneous watch error in a full winding state is about 18 seconds per day (about 18 seconds fast per day). When 20 hour elapses from the full winding state, the instantaneous watch error becomes about 13 seconds per day (about 13 seconds fast per day). When 30 hours elapses from the full winding state, the instantaneous watch error becomes about −2 seconds per day (about 2 seconds slow per day).

In the mechanical timepiece of the invention, if assuming the balance rotation-angle control mechanism is not operated, as shown in FIG. 27 the x-marked plotting and thin line in a state the stud mainspring 140c at the outer end is in contact with the first contact member 168a or in contact with the second contact member 168b, the instantaneous watch error in a full winding state is about 18 seconds per day (about 18 seconds fast per day). When 20 hour elapses from the full winding state, the instantaneous watch error becomes about 13 seconds per day (about 13 seconds fast per day). When 30 hours elapses from the full winding state, the instantaneous watch error becomes about −2 seconds per day (about 2 seconds slow per day).

Contrary to this, in the mechanical timepiece of the invention, when the balance rotation-angle control mechanism is operated, in a state the balance rotation-angle control mechanism is operative, i.e. before lapse of 27 hours from the full winding state of the mainspring the instantaneous watch error can maintain about 5 seconds per day (maintains a state of about 5 seconds fast per day) as shown in black-circle plotting and extreme bold line in FIG. 27. When 30 hours elapses from the full winding state, the instantaneous watch error becomes about −2 seconds per day (about 2 seconds slow per day).

The mechanical timepiece of the invention is structured to control the rotation angle of the balance with hairspring while coping with various positions of the mechanical timepiece. Accordingly, it is possible to keep nearly constant the swing angle even when the mechanical timepiece is in any position.

As a result, the mechanical timepiece of the invention can maintain the characteristic shown by the black-circles plotting and extreme thick line in FIG. 27 even when the mechanical timepiece is in any position.

(7) Effect of the Invention

The mechanical timepiece of the present invention can extremely effectively control the swing angle of the balance with hairspring even when the mechanical timepiece is in any position. Consequently, the mechanical timepiece of the invention can suppress the changing of instantaneous watch error of the timepiece. If compared to the conventional timepiece shown by squares plotting and bold line in FIG. 27, it is possible to increase the lapse time from full winding having an instantaneous watch error of approximately 0 to 5 seconds per day.

That is, in the mechanical timepiece of the invention, the sustaining time having an instantaneous watch error of within about plus/minus 5 seconds per day is approximately 32 hours. This sustaining time value is approximately 1.45 times a sustaining time of about 22 hours of the conventional mechanical timepiece having an instantaneous watch error of within about plus/minus 5 seconds per day.

Thus, a simulation result was obtained that the mechanical timepiece of the invention was high in accuracy as compared to the conventional mechanical timepiece.

INDUSTRIAL APPLICABILITY

The mechanical timepiece of the present invention has a simple structure and is suited for realizing a mechanical timepiece very high in accuracy.

Furthermore, the mechanical timepiece of the invention can manufacture a highly accurate mechanical timepiece with further accuracy.

What is claimed is:

1. A mechanical timepiece comprising: a mainspring for generating a rotational force; a front train wheel for undergoing rotation in accordance with the rotational force generated by the mainspring; an escapement/speed-control device for controlling rotation of the front train wheel, the escapement/speed-control device having a balance with hairspring for undergoing reciprocal rotational movement, an escape wheel and pinion for undergoing rotation in accordance with rotation of the front train wheel, and a pallet fork for controlling rotation of the escape wheel and pinion in accordance with rotation of the balance with hairspring; a stitch mechanism for outputting an ON signal when a rotation angle of the balance with hairspring becomes a predetermined threshold angle or greater and for outputting an OFF signal when the rotation angle of the balance with hairspring does not exceed the predetermined threshold angle; a position-detecting device for detecting a position of the mechanical timepiece; and a balance-with-hairspring rotation angle control mechanism for applying a force to suppress rotation of the balance with hairspring when the switch mechanism outputs an ON signal in accordance with a position of the mechanical timepiece detected by the position-detecting device.

2. A mechanical timepiece as claimed in claim 1; wherein the switch mechanism outputs an ON signal when a stud mainspring disposed on the balance with hairspring contacts a switch lever.

3. A mechanical timepiece as claimed in claim 2; wherein the balance-with-hairspring rotation angle control mechanism has a balance magnet disposed on the balance with hairspring and a plurality of coils arranged to apply a magnetic force to the balance magnet to suppress rotation of the balance with hairspring when the switch mechanism outputs an ON signal and not to apply a magnetic force to the balance magnet when the switch mechanism outputs an OFF signal.

4. A mechanical timepiece as claimed in claim 3; wherein the position-detecting device has a case having a hexahedron shape, a plurality of electrodes each disposed on a respective one of inner surfaces of the case, and a conductive fluid disposed in the case.

5. A mechanical timepiece as claimed in claim 4; wherein the conductive fluid selectively contacts five of the electrodes, four of the electrodes or three of the electrodes.

6. A mechanical timepiece as claimed in claim 3; wherein position-detecting device has a case having a hexahedron shape, a plurality of electrodes disposed on inner surfaces of the case, and a conductive fluid disposed in the case.

7. A mechanical timepiece as claimed in claim 2; wherein the position-detecting device has a case having a hexahedron shape and formed of an insulating material, six electrodes respectively arranged on inner surfaces of the case, a conductive fluid disposed in the case, and a plurality of resistances having different resistance values and disposed in a conducting state with the electrodes, one of resistances being connected with the coils in accordance with a position of the mechanical timepiece detected by the position-detecting device.

8. A mechanical timepiece as claimed in claim 1; wherein the balance-with-hairspring rotation angle control mechanism has a balance magnet disposed on the balance with hairspring and a plurality of coils arranged to apply a magnetic force to the balance magnet to suppress rotation of the balance with hairspring when the switch mechanism outputs an ON signal and not to apply a magnetic force to the balance magnet when the switch mechanism outputs an OFF signal.

9. A mechanical timepiece as claimed in claim 1; wherein the position-detecting device has a case having a hexahedron shape, a plurality of electrodes each disposed on a respective one of inner surfaces of the case, and a conductive fluid disposed in the case.

10. A mechanical timepiece as claimed in claim 1; wherein the position-detecting device has a case having a hexahedron shape, a plurality of electrodes disposed on inner surfaces of the case, and a conductive fluid disposed in the case.

11. A mechanical timepiece as claimed in claim 2; wherein the position-detecting device has a case having a hexahedron shape, a plurality of electrodes each disposed on a respective one of inner surfaces of the case, and a conductive fluid disposed in the case.

12. A mechanical timepiece as claimed in claim 2; wherein the position-detecting device has a case having a hexahedron shape, a plurality of electrodes disposed on inner surfaces of the case, and a conductive fluid disposed in the case.

13. A mechanical timepiece comprising: a main plate; at least one coil mounted on a main surface of the main plate; a mainspring for generating a rotational force; a front train wheel for undergoing rotation in accordance with the rotational force generated by the mainspring; a control mechanism for controlling rotation of the front train wheel and having a timed annular balance for undergoing reciprocal rotational movement; a position-detecting device for detecting a position of the mechanical timepiece; and a balance magnet mounted on a surface of the timed annular balance opposite to the main surface of the main plate and spaced-apart from the coil with a clearance sufficient so that a magnetic flux of the balance magnet generates a current on the coil when the balance magnet is energized for controlling rotation of the timed annular balance in accordance with a position of the mechanical timepiece detected by the position-detecting device.

14. A mechanical timepiece according to claim 13; wherein the front train wheel comprises a barrel complete supported for undergoing rotation relative to the main plate, a center wheel for undergoing rotation in accordance with rotation of the barrel complete, a third wheel for undergoing rotation in accordance with rotation of the center wheel, and a fourth wheel for undergoing rotation in accordance with the third wheel.

15. A mechanical timepiece according to claim 13; wherein the control mechanism further comprises an escape wheel for undergoing rotation in accordance with rotation of the front train wheel an a pallet fork for controlling rotation of the escape wheel.

16. A mechanical timepiece according to claim 13; wherein the at least one coil comprises a plurality of coils.

17. A mechanical timepiece according to claim 13; further comprising a switch mechanism for outputting an ON signal to suppress rotation of the timed annular balance when a rotation angle of the timed annular balance becomes a predetermined threshold angle or greater and for outputting an OFF signal so that rotation of the timed annular balance is not suppressed when the rotation angle of the timed annular balance does not exceed the predetermined threshold angle.

* * * * *